United States Patent
Thomas et al.

(10) Patent No.: US 10,235,807 B2
(45) Date of Patent: Mar. 19, 2019

(54) BUILDING HOLOGRAPHIC CONTENT USING HOLOGRAPHIC TOOLS

(71) Applicant: MICROSOFT TECHNOLOGY LICENSING, LLC, Redmond, WA (US)

(72) Inventors: Michael Thomas, Redmond, WA (US); Jonathan Paulovich, Redmond, WA (US); Adam G. Poulos, Sammamish, WA (US); Omer Bilal Orhan, Bellevue, WA (US); Marcus Ghaly, Kirkland, WA (US); Cameron G. Brown, Bellevue, WA (US); Nicholas Gervase Fajt, Seattle, WA (US); Matthew Kaplan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 285 days.

(21) Appl. No.: 14/600,886

(22) Filed: Jan. 20, 2015

(65) Prior Publication Data
US 2016/0210781 A1    Jul. 21, 2016

(51) Int. Cl.
| G06T 17/10 | (2006.01) |
| G06T 19/00 | (2011.01) |
| G02B 27/01 | (2006.01) |
| G06F 3/01 | (2006.01) |
| G06F 1/16 | (2006.01) |

(52) U.S. Cl.
CPC .......... *G06T 19/006* (2013.01); *G02B 27/017* (2013.01); *G06F 3/011* (2013.01); *G06F 3/013* (2013.01); *G06F 3/017* (2013.01); *G06T 17/10* (2013.01); *G02B 2027/0141* (2013.01); *G02B 2027/0178* (2013.01); *G02B 2027/0187* (2013.01); *G06F 1/163* (2013.01)

(58) Field of Classification Search
CPC .................................................. G06F 2217/02
See application file for complete search history.

(56) References Cited

U.S. PATENT DOCUMENTS

| 4,789,931 | A  | * | 12/1988 | Kuragano | .......... | G05B 19/4099 318/572 |
| 6,293,284 | B1 | * | 9/2001 | Rigg | .................... | A45D 44/005 132/200 |
| 6,389,375 | B1 | * | 5/2002 | Thomsen | ................ | G06T 17/10 345/420 |
| 6,629,065 | B1 | * | 9/2003 | Gadh | ...................... | G06T 17/10 345/420 |
| 6,741,245 | B1 | * | 5/2004 | Marks | .................. | A63H 33/042 345/420 |
| 8,576,276 | B2 | | 11/2013 | Bar-Zeev et al. | | |
| 8,643,569 | B2 | | 2/2014 | Vesely | | |
| 8,704,879 | B1 | | 4/2014 | Cheng et al. | | |
| 9,165,318 | B1 | * | 10/2015 | Pauley | ............... | G06Q 30/0623 |
| 9,383,895 | B1 | * | 7/2016 | Vinayak | .................. | G06F 3/017 |

(Continued)

OTHER PUBLICATIONS

Screen capture of SciFi Med Gear WebArchive Dec. 25, 2014.*

(Continued)

*Primary Examiner* — Jitesh Patel
(74) *Attorney, Agent, or Firm* — Arent Fox LLP

(57) ABSTRACT

A system and method are disclosed for building virtual content from within a virtual environment using virtual tools to build and modify the virtual content.

20 Claims, 25 Drawing Sheets

(56) References Cited

U.S. PATENT DOCUMENTS

| | | | | |
|---|---|---|---|---|
| 2001/0007095 | A1* | 7/2001 | Kehrle | G06T 17/10 703/2 |
| 2002/0133264 | A1* | 9/2002 | Maiteh | G05B 19/4097 700/182 |
| 2002/0196250 | A1* | 12/2002 | Anderson | G06T 19/00 345/420 |
| 2003/0085866 | A1* | 5/2003 | Bimber | G05B 19/186 345/156 |
| 2004/0098151 | A1* | 5/2004 | Carlucci | G06F 17/50 700/95 |
| 2005/0251038 | A1* | 11/2005 | Liang | G06T 19/00 600/437 |
| 2005/0264858 | A1 | 12/2005 | Vesely et al. | |
| 2006/0209019 | A1* | 9/2006 | Hu | G06F 3/016 345/156 |
| 2007/0262984 | A1* | 11/2007 | Pruss | G06T 19/20 345/420 |
| 2008/0061145 | A1* | 3/2008 | McGushion | G06Q 10/08 235/462.13 |
| 2009/0271436 | A1* | 10/2009 | Reisinger | G06F 17/5009 |
| 2010/0305908 | A1* | 12/2010 | Kidera | B60R 16/0207 703/1 |
| 2010/0311028 | A1* | 12/2010 | Bell, III | G09B 23/28 434/263 |
| 2011/0029903 | A1* | 2/2011 | Schooleman | G06F 3/011 715/764 |
| 2011/0087479 | A1* | 4/2011 | Baszucki | A63F 13/12 703/22 |
| 2011/0270586 | A1* | 11/2011 | Diguet | G06F 17/50 703/1 |
| 2012/0075343 | A1* | 3/2012 | Chen | G09G 5/397 345/633 |
| 2012/0120113 | A1* | 5/2012 | Hueso | G06F 3/011 345/672 |
| 2012/0306853 | A1* | 12/2012 | Wright | G06T 19/20 345/419 |
| 2013/0154913 | A1 | 6/2013 | Genc et al. | |
| 2013/0187905 | A1* | 7/2013 | Vaddadi | G06T 15/205 345/419 |
| 2013/0321462 | A1 | 12/2013 | Salter et al. | |
| 2013/0335405 | A1* | 12/2013 | Scavezze | G06T 19/20 345/419 |
| 2013/0342564 | A1 | 12/2013 | Kinnebrew et al. | |
| 2014/0016823 | A1* | 1/2014 | Ye | G06T 19/20 382/103 |
| 2014/0129185 | A1* | 5/2014 | Ahn | G06F 17/50 703/1 |
| 2014/0173721 | A1* | 6/2014 | Shenfield | G06F 3/0488 726/21 |
| 2014/0188756 | A1* | 7/2014 | Ponnavaikko | G06K 9/00449 705/342 |
| 2014/0282008 | A1* | 9/2014 | Verard | G03H 1/00 715/728 |
| 2014/0282220 | A1* | 9/2014 | Wantland | G06F 3/04845 715/782 |
| 2015/0042785 | A1* | 2/2015 | Robertson | G06K 9/78 348/95 |
| 2015/0054784 | A1* | 2/2015 | Kim | G06F 3/0416 345/174 |

OTHER PUBLICATIONS

"View Model Details", Published on: Apr. 28, 2013 Available at: http://docs.oracle.com/cd/E17802_01/j2se/javase/technologies/desktop/java3d/forDevelopers/j3dguide/AppendixView.doc.html.

"3D visualization and imaging system lab", Published on: Apr. 6, 2010 Available at: http://3dvis.optics.arizona.edu/research/research.html.

* cited by examiner (Step 626)

*(Step 632)*

(Step 632)

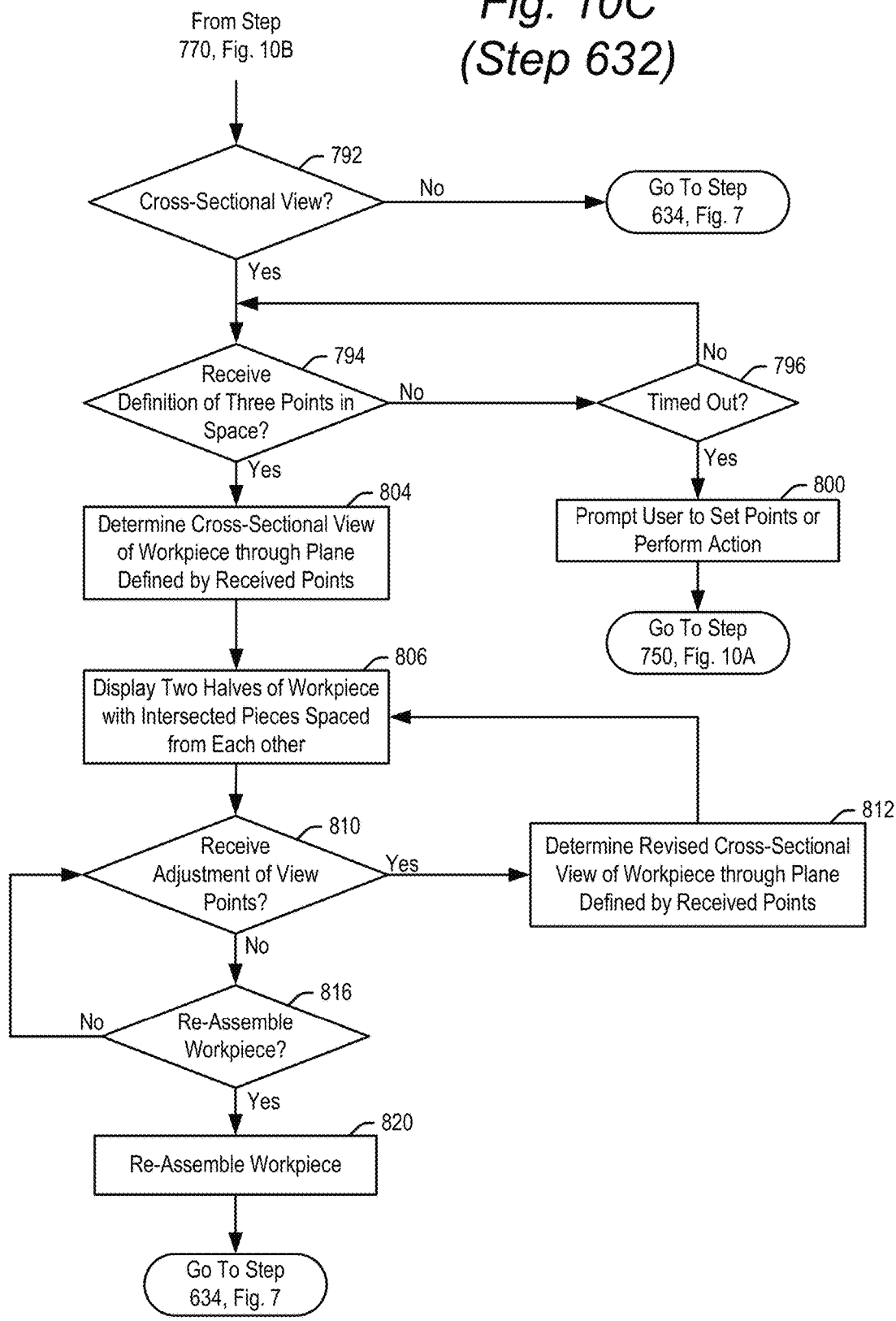

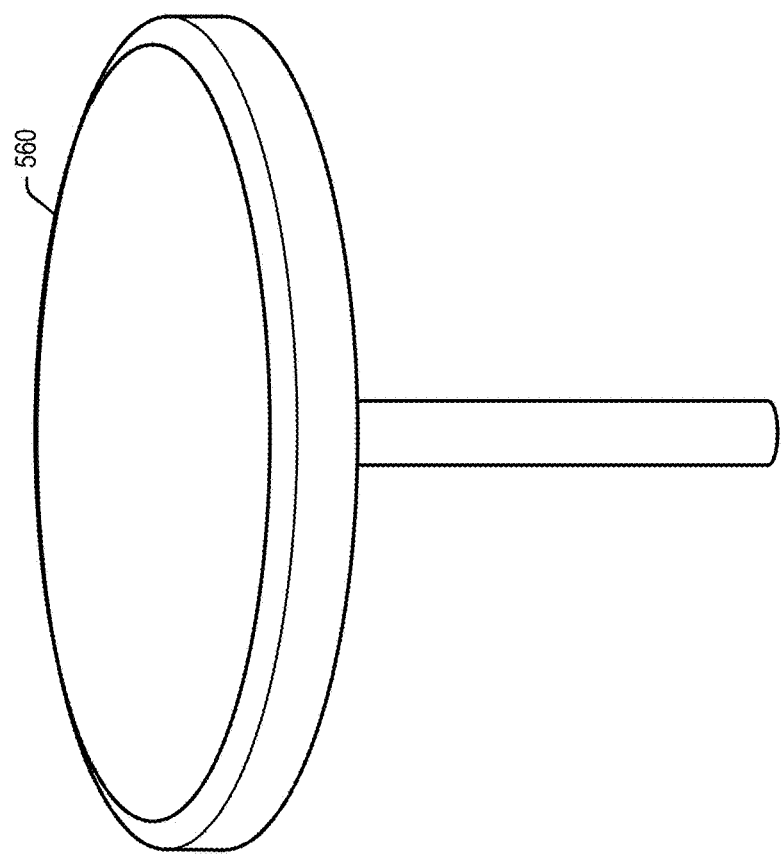
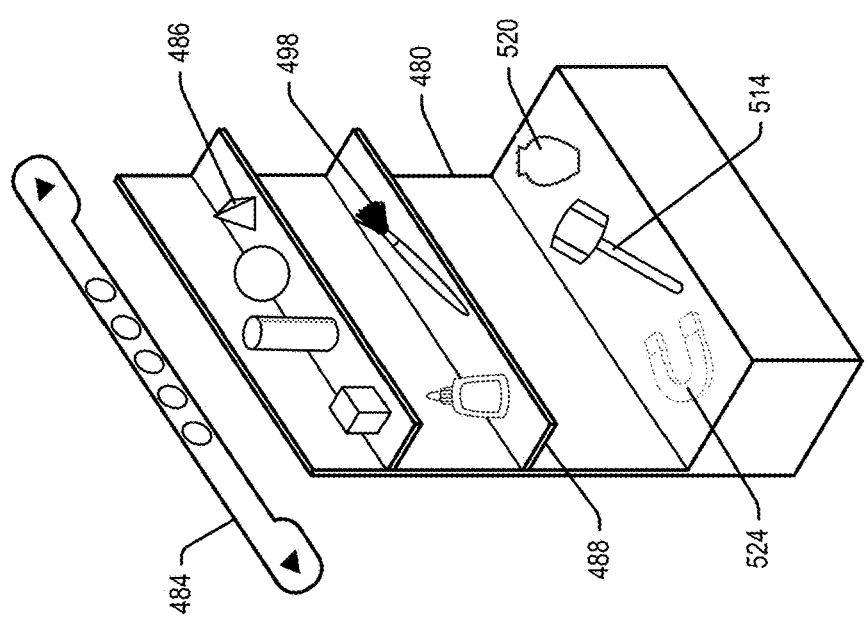
Fig. 14

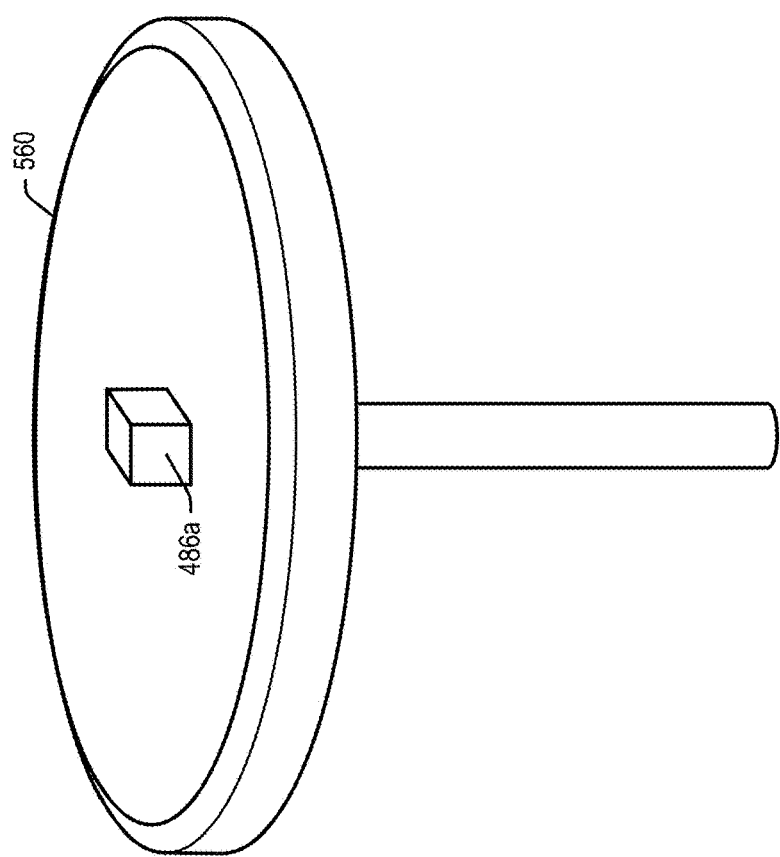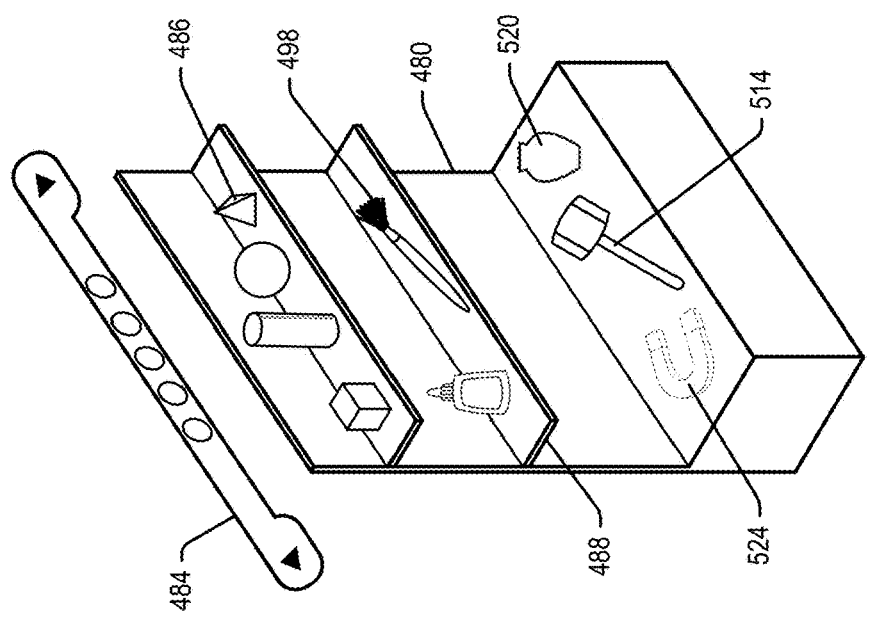
Fig. 16

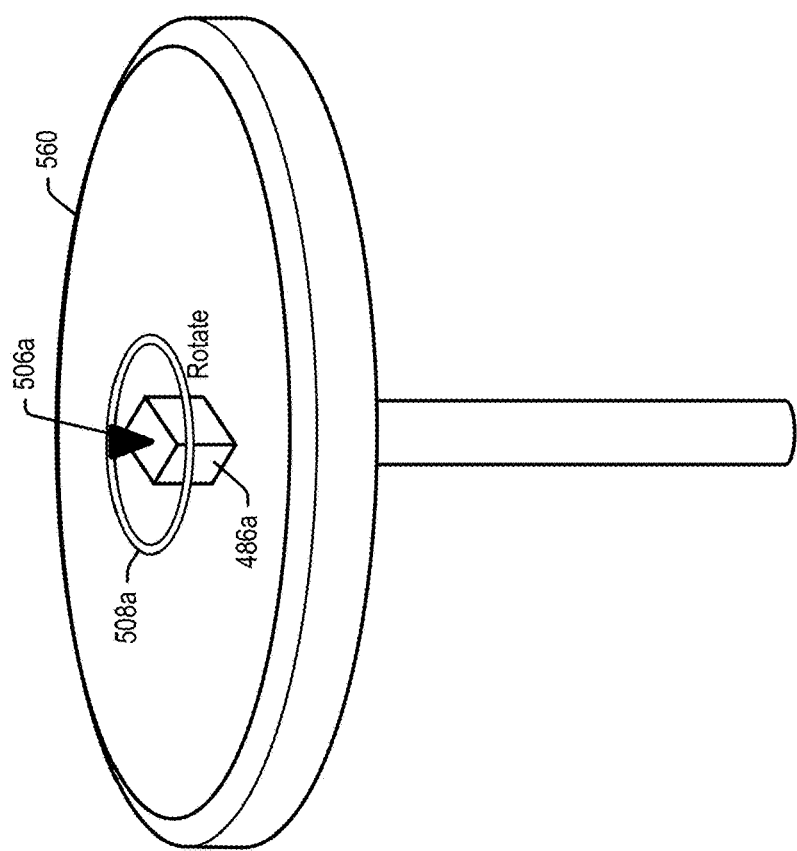
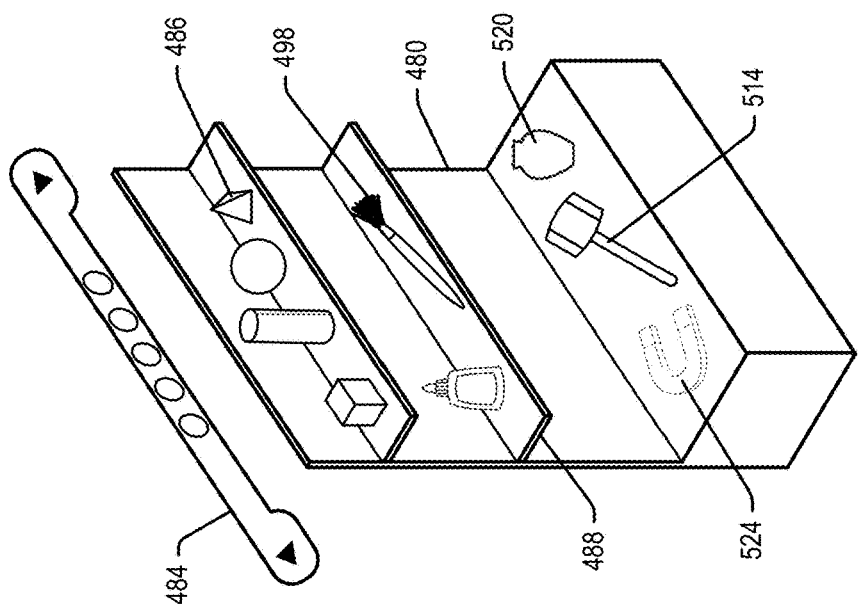
Fig. 17

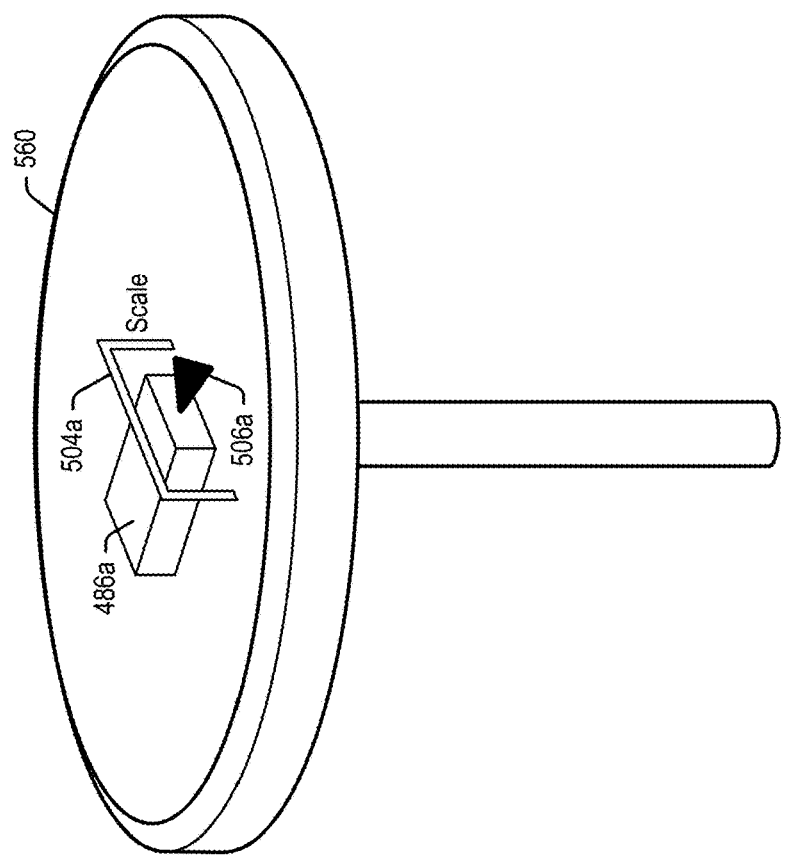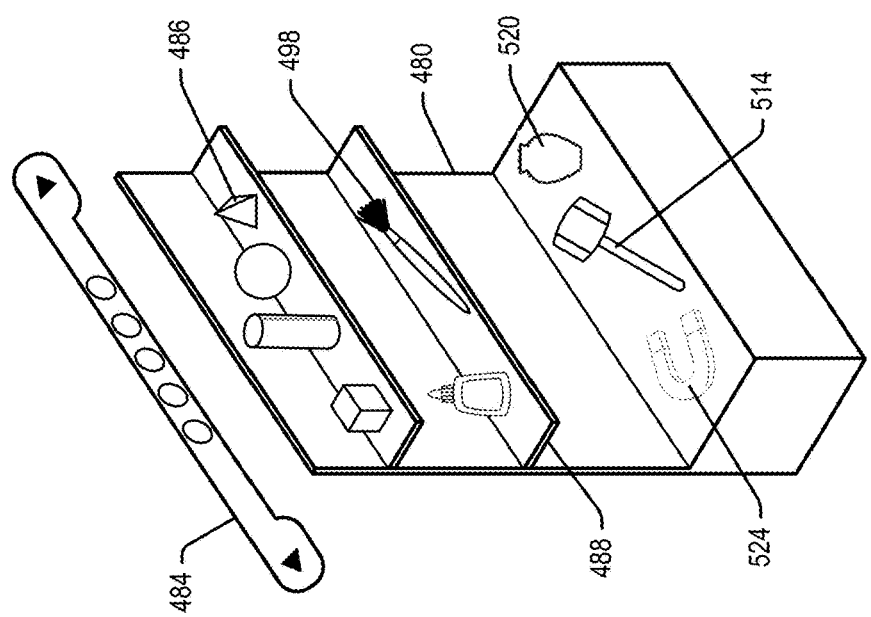
Fig. 18

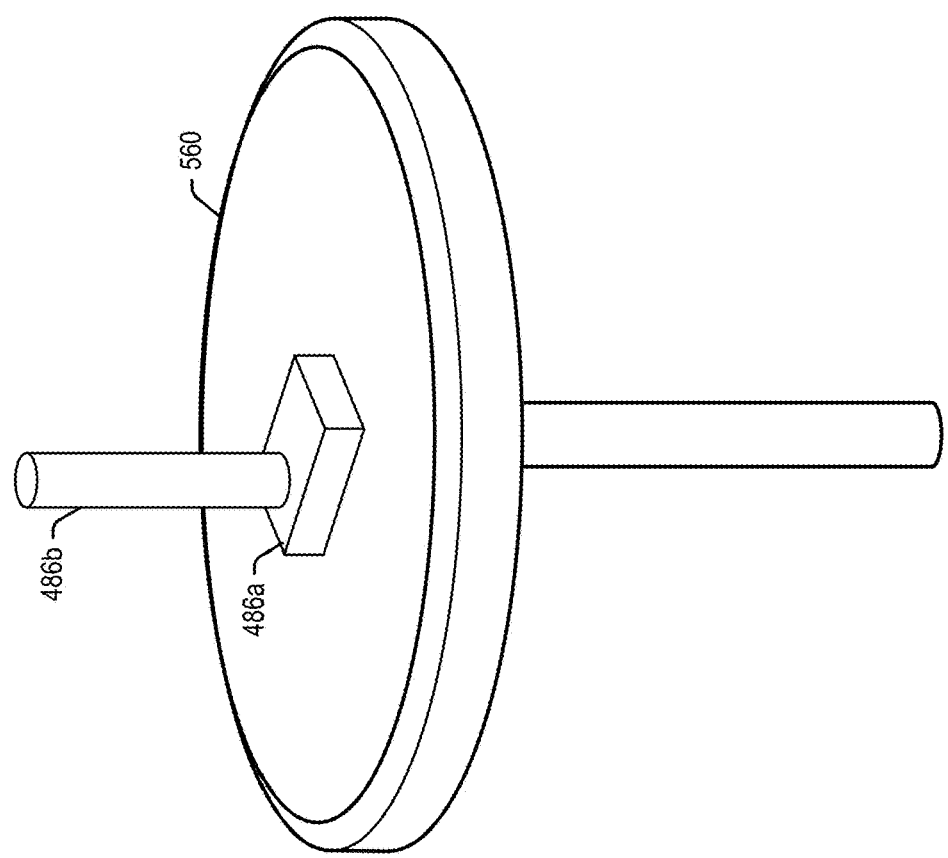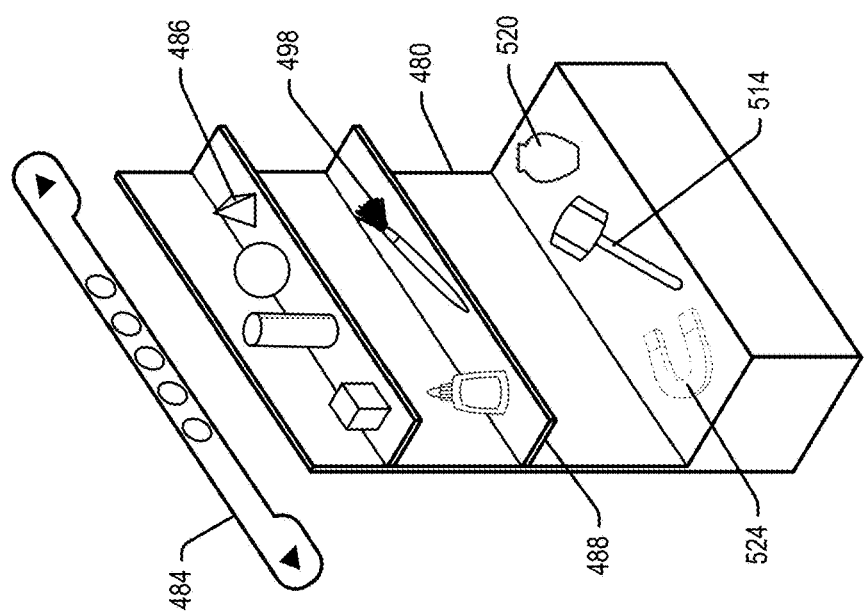
Fig. 19

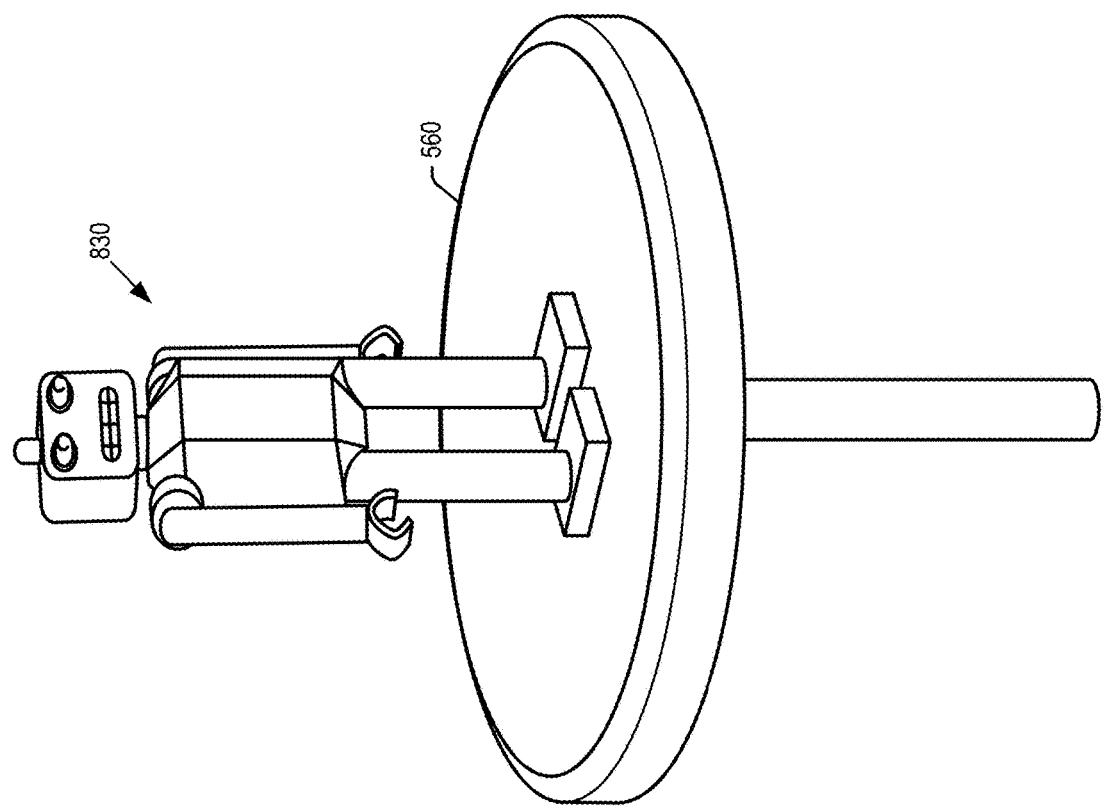
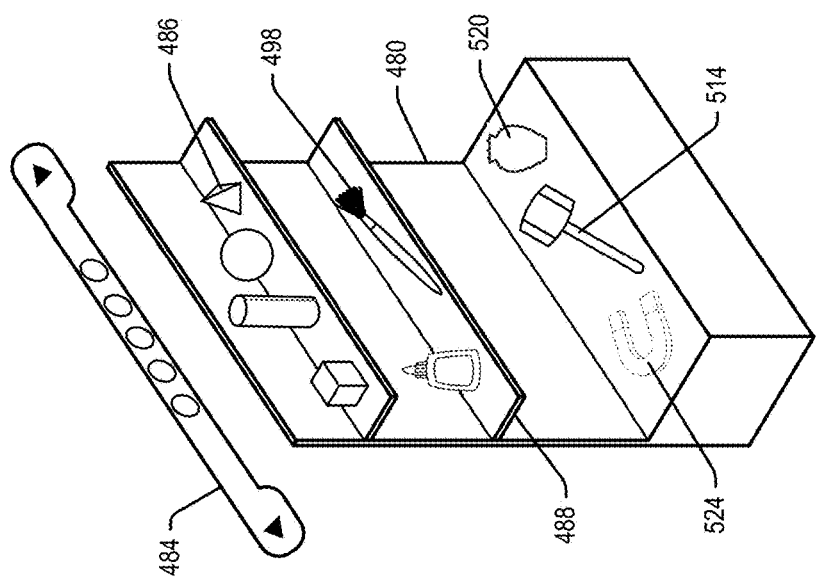
Fig. 22

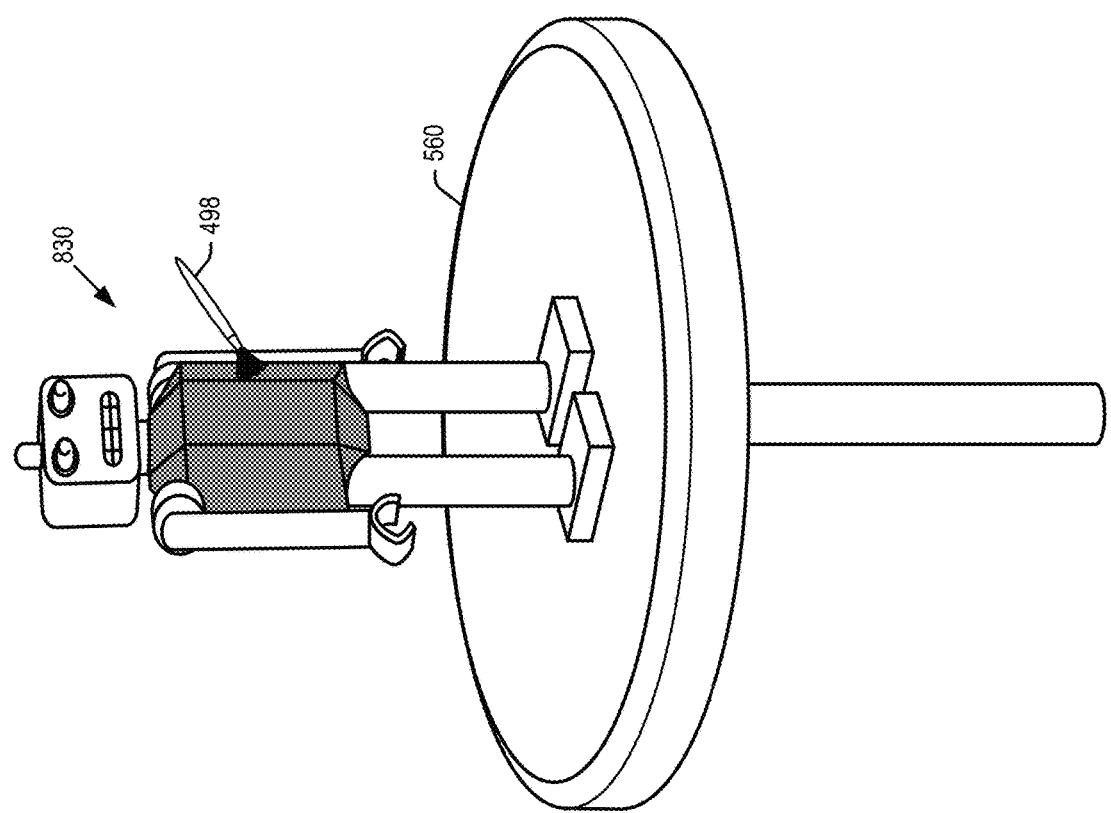
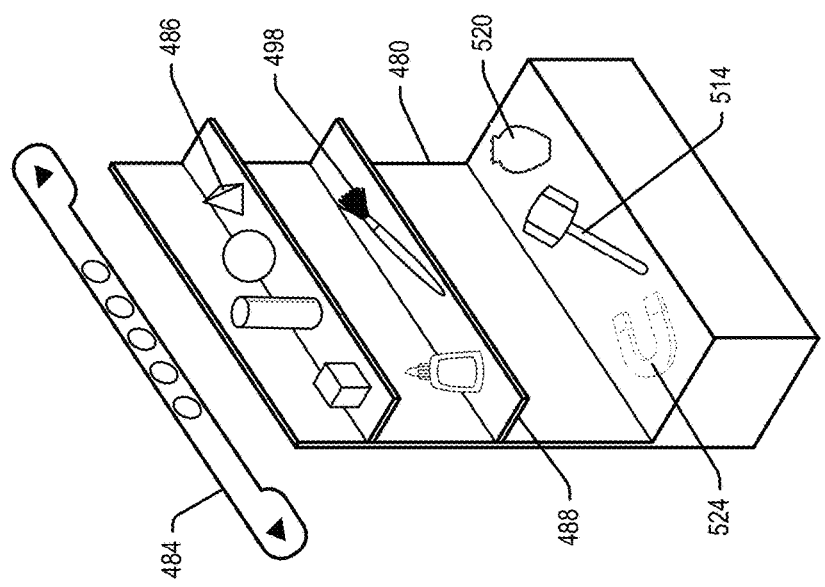
Fig. 23

BUILDING HOLOGRAPHIC CONTENT USING HOLOGRAPHIC TOOLS

BACKGROUND

Mixed reality is a technology that allows virtual imagery to be mixed with a real-world physical environment. A see-through, head mounted, mixed reality display device may be worn by a user to view the mixed imagery of real objects and virtual objects displayed in the user's field of view. Content generation software applications are known allowing creators to generate three-dimensional virtual objects, which objects may then be used in a mixed reality environment. Users of such software applications fashion and edit virtual objects on a computer by interacting with traditional input devices such as a mouse and keyboard, while viewing objects being created and edited on a two-dimensional monitor.

There are a few drawbacks to this method of virtual object creation. Creating virtual objects for a three-dimensional environment on a two-dimensional monitor results in some guesswork by the content creator as to how various aspects of the virtual object will translate when displayed in the virtual environment. Often aspects of a virtual object created on the two-dimensional monitor appear differently when viewed in three-dimensions. Moreover, creating virtual objects on a two-dimensional monitor makes it difficult to get a sense of scale and perspective for the virtual object when placed with other virtual objects in the virtual environment.

SUMMARY

Embodiments of the present technology relate to a system and method for building and experiencing three-dimensional virtual objects from within a mixed reality environment using virtual tools. A system for creating virtual objects within a virtual environment in general includes a see-through, head mounted display device coupled to at least one processing unit. The processing unit in cooperation with the head mounted display device(s) are able to display a virtual workshop including virtual tools with which a user may interact to build a variety of virtual objects, all from within the mixed reality environment. Allowing a user to build virtual objects in a virtual environment in which they will be viewed simplifies the creation process and improves the ability of the user to fit the scale and perspective of virtual objects together in the environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 11-23 illustrate examples of virtual environments for building virtual content according to aspects of the present technology.

DETAILED DESCRIPTION

Figure 1:
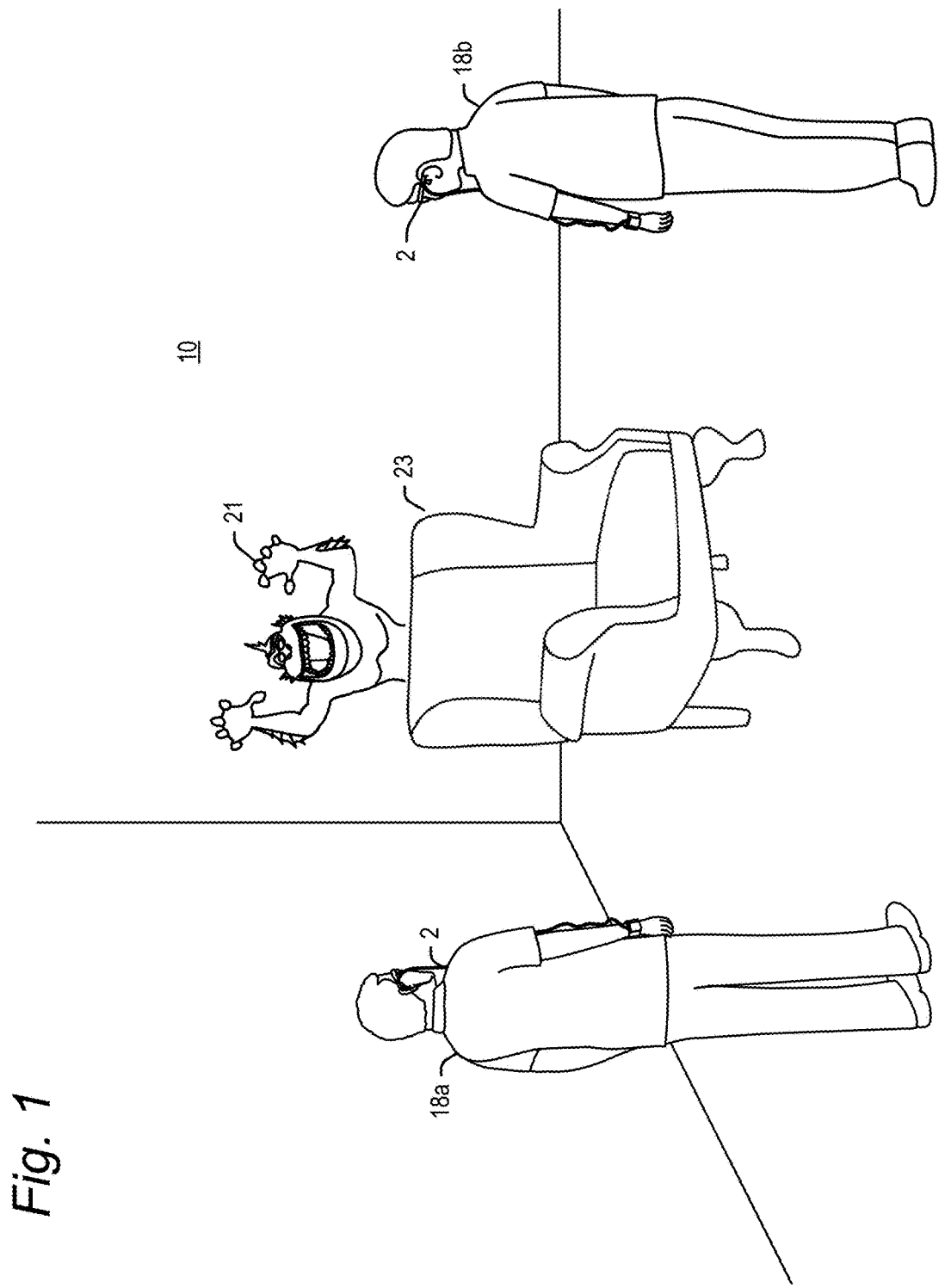
FIG. 1 is an illustration of a virtual reality environment including real and virtual objects.

Embodiments of the present technology will now be described with reference to the figures, which in general relate to a system and method for building virtual objects, also referred to herein as holograms, using virtual tools in a mixed reality environment. In embodiments, the system and method may use a mobile mixed reality assembly to generate a three-dimensional mixed reality environment. The mixed reality assembly includes a mobile processing unit coupled to a head mounted display device (or other suitable apparatus) having a camera and a display element.

The display element is to a degree transparent so that a user can look through the display element at real world objects within the user's field of view (FOV). The display element also provides the ability to project virtual images into the FOV of the user such that the virtual images may also appear alongside the real world objects. The system automatically tracks where the user is looking so that the system can determine where to insert a virtual image in the FOV of the user. Once the system knows where to project the virtual image, the image is projected using the display element.

In embodiments, the processing unit may build a model of the environment including the x, y, z Cartesian positions of users, real world objects and virtual three-dimensional objects in the room or other environment. The positions of each head mounted display device may be calibrated to the model of the environment. This allows the system to determine each user's line of sight and FOV of the environment. Thus, a virtual image may be displayed to each user, but the system determines the display of the virtual image from each user's perspective, adjusting the virtual image for parallax and any occlusions of or by other objects in the environment. The three-dimensional model of the environment, referred to herein as a scene map, as well as all tracking of each user's FOV and objects in the environment may be generated by the mobile processing unit by itself, or working in tandem with other processing devices as explained hereinafter.

A virtual environment provided by the present system may be coextensive with a real world space. In other words, the virtual environment may be laid over and share the same area as a real world space. A user moving around a real world space may also move around in the coextensive virtual environment, and view virtual and/or real objects from different perspectives and vantage points. One type of virtual environment is a mixed reality environment, where the virtual environment includes both virtual objects and real-world objects. Another type of virtual environment includes only virtual objects.

The virtual environment may fit within the confines of a room or other real-world space. Alternatively, the virtual environment may be larger than the confines of the real-world physical space. Virtual environments may be completely created by one or more users. Alternatively, portions of the virtual environment may be downloaded, for example from a software application running on the processing unit.

As explained below, aspects of the present system allow users to generate virtual objects that are displayed three-dimensionally to the user as they are being created. The processing unit may execute a content-generation software application, which presents virtual tools to a user. The user may interact with these virtual tools to build virtual objects within the virtual environment. As utilized herein, the term "user" may refer to a content creator using a mixed reality system to create, edit and/or animate virtual objects. The term "end user" may refer to those who thereafter experience the completed virtual objects using a mixed reality system.

The terms "virtual object" and "hologram" as used herein includes virtual workpieces that are partially or fully completed. For example, a user may choose to create a virtual workpiece in the form of an animal. During its construction, a part of the animal may be displayed, or a generalized wireframe image may be displayed, that will be further shaped by the user into an animal. The displayed parts and the generalized wireframe are both virtual objects, or virtual workpieces, as used herein. A virtual object may be described herein as a "completed virtual object" once work on the virtual object is finished.

As described below, a user may interact with virtual tools to build virtual objects, and a user may also interact with a virtual object, either directly or through the use of virtual tools. The term "interact" encompasses both physical and verbal gestures. Physical gestures include a user performing a predefined gesture using his or her fingers, hands and/or other body parts recognized by the mixed reality system as a user command for the system to perform a predefined action. Such predefined gestures may include, but are not limited to, pointing at, grabbing, pushing, resizing and shaping virtual objects. Physical interaction may further include contact by the user with a virtual object. For example, a user may position his or her hands in three-dimensional space at a location corresponding to the position of a virtual object. The user may thereafter perform a gesture, such as grabbing or pushing, which is interpreted by the mixed reality system, and the corresponding action is performed on the virtual object, e.g., the object may be grabbed and may thereafter be carried in the hand of the user, or the object may be pushed and is moved an amount corresponding to the degree of the pushing motion. As a further example, a user can interact with a virtual button by pushing it.

A user may also physically interact with a virtual object with his or her eyes. In some instances, eye gaze data identifies where a user is focusing in the FOV, and can thus identify that a user is looking at a particular virtual object. Sustained eye gaze, or a blink or blink sequence, may thus be a physical interaction whereby a user selects one or more virtual objects.

A user may alternatively or additionally interact with virtual objects using verbal gestures, such as for example a spoken word or phrase recognized by the mixed reality system as a user command for the system to perform a predefined action. Verbal gestures may be used in conjunction with physical gestures to interact with one or more virtual objects in the virtual environment.

Figure 2:
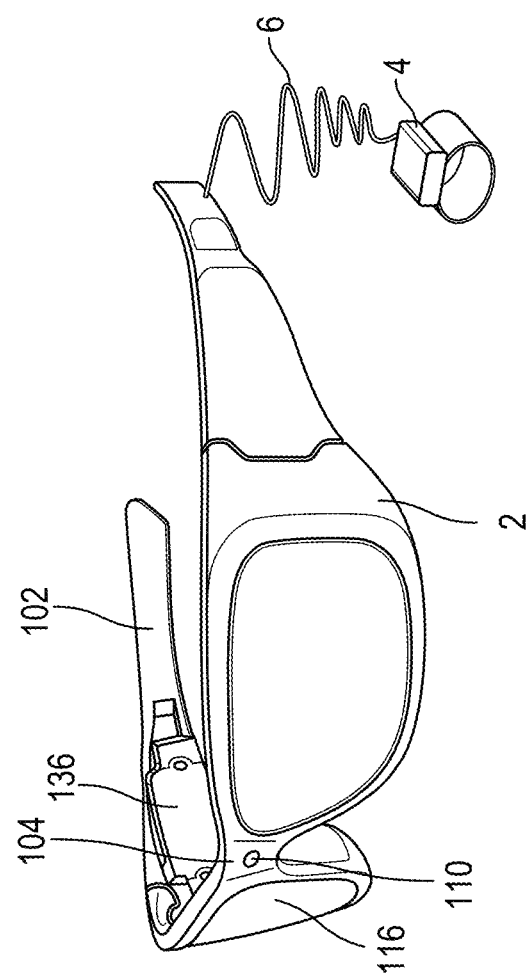
FIG. 2 is a perspective view of one embodiment of a head mounted display unit.

FIG. 1 illustrates a mixed reality environment 10 for providing a mixed reality experience to users by fusing virtual content 21 (completed virtual content in this example) with real content 23 within each user's FOV. FIG. 1 shows two users 18a and 18b, each wearing a head mounted display device 2, and each viewing the virtual content 21 adjusted to their perspective. It is understood that the particular virtual content shown in FIG. 1 is by way of example only, and may be any of a wide variety of virtual objects, including virtual tools and virtual workpieces as explained below. As shown in FIG. 2, each head mounted display device 2 may include or be in communication with its own processing unit 4, for example via a flexible wire 6. The head mounted display device may alternatively communicate wirelessly with the processing unit 4. In further embodiments, the processing unit 4 may be integrated into the head mounted display device 2. Head mounted display device 2, which in one embodiment is in the shape of glasses, is worn on the head of a user so that the user can see through a display and thereby have an actual direct view of the space in front of the user. More details of the head mounted display device 2 and processing unit 4 are provided below.

Where not incorporated into the head mounted display device 2, the processing unit 4 may be a small, portable device for example worn on the user's wrist or stored within a user's pocket. The processing unit 4 may include hardware components and/or software components to execute applications such as gaming applications, non-gaming applications, or the like. In one embodiment, processing unit 4 may include a processor such as a standardized processor, a specialized processor, a microprocessor, or the like that may execute instructions stored on a processor readable storage device for performing the processes described herein. In embodiments, the processing unit 4 may communicate wirelessly (e.g., WiFi, Bluetooth, infra-red, or other wireless communication means) to one or more remote computing systems. These remote computing systems may including a computer, a gaming system or console, or a remote service provider.

The head mounted display device 2 and processing unit 4 may cooperate with each other to present virtual objects 21 to a user in a mixed reality environment 10. The details of the present system for building virtual objects are explained below. The details of the mobile head mounted display device 2 and processing unit 4 which enable the building of virtual objects will now be explained with reference to FIGS. 2-6.

Figure 3:
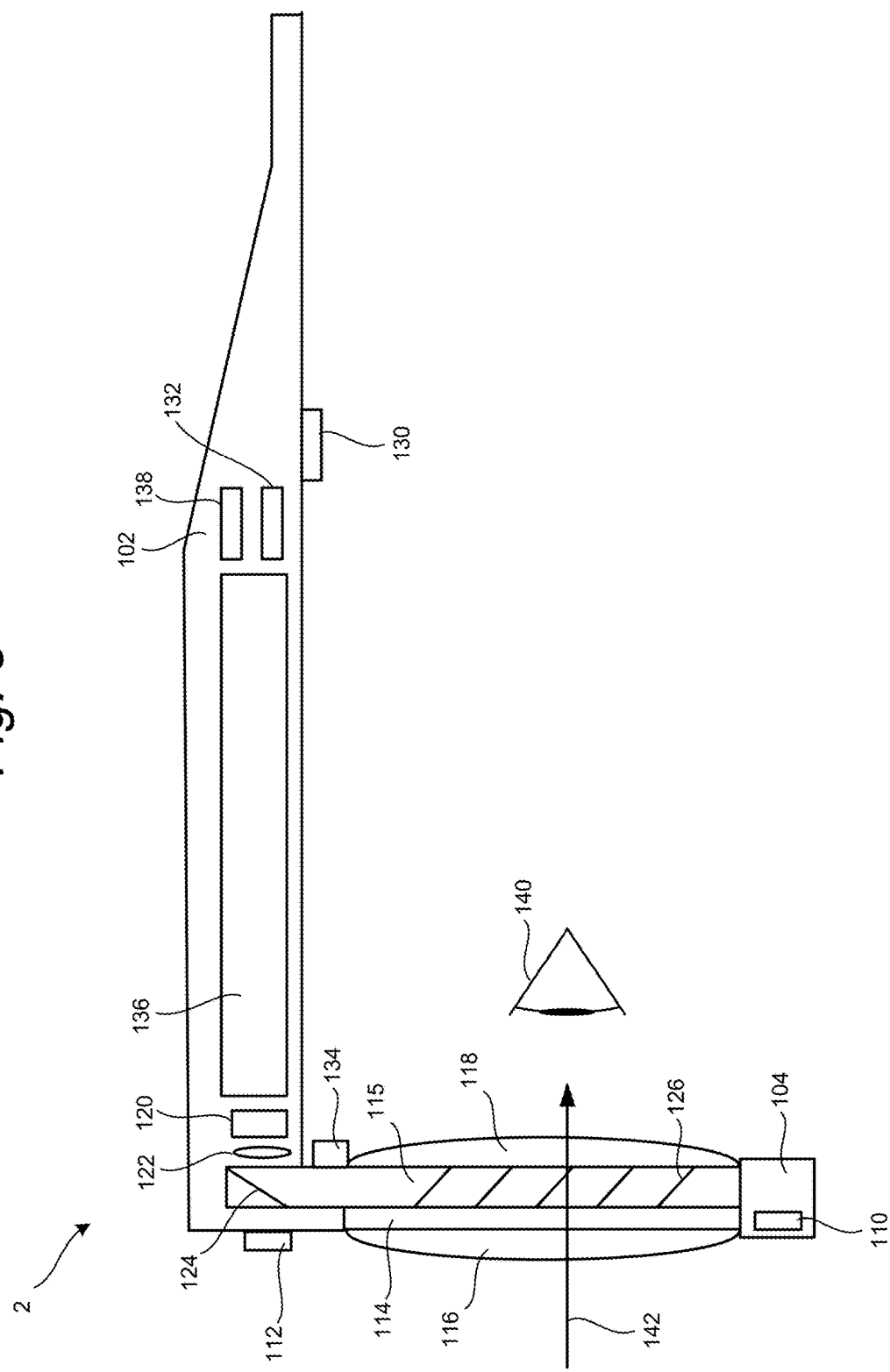
FIG. 3 is a side view of a portion of one embodiment of a head mounted display unit.

FIGS. 2 and 3 show perspective and side views of the head mounted display device 2. FIG. 3 shows only the right side of head mounted display device 2, including a portion of the device having temple 102 and nose bridge 104. Built into nose bridge 104 is a microphone 110 for recording sounds and transmitting that audio data to processing unit 4, as described below. At the front of head mounted display device 2 is room-facing video camera 112 that can capture video and still images. Those images are transmitted to processing unit 4, as described below.

A portion of the frame of head mounted display device 2 will surround a display (that includes one or more lenses). In order to show the components of head mounted display device 2, a portion of the frame surrounding the display is not depicted. The display includes a light-guide optical element 115, opacity filter 114, see-through lens 116 and see-through lens 118. In one embodiment, opacity filter 114 is behind and aligned with see-through lens 116, light-guide optical element 115 is behind and aligned with opacity filter 114, and see-through lens 118 is behind and aligned with light-guide optical element 115. See-through lenses 116 and 118 are standard lenses used in eye glasses and can be made to any prescription (including no prescription). In one embodiment, see-through lenses 116 and 118 can be replaced by a variable prescription lens. Opacity filter 114 filters out natural light (either on a per pixel basis or uniformly) to enhance the contrast of the virtual imagery. Light-guide optical element 115 channels artificial light to the eye. More details of opacity filter 114 and light-guide optical element 115 are provided below.

Mounted to or inside temple 102 is an image source, which (in one embodiment) includes microdisplay 120 for projecting a virtual image and lens 122 for directing images from microdisplay 120 into light-guide optical element 115. In one embodiment, lens 122 is a collimating lens.

Control circuits 136 provide various electronics that support the other components of head mounted display device 2. More details of control circuits 136 are provided below with respect to FIG. 4. Inside or mounted to temple 102 are ear phones 130, inertial measurement unit 132 and temperature sensor 138. In one embodiment shown in FIG. 4, the inertial measurement unit 132 (or IMU 132) includes inertial sensors such as a three axis magnetometer 132A, three axis gyro 132B and three axis accelerometer 132C. The inertial measurement unit 132 senses position, orientation, and sudden accelerations (pitch, roll and yaw) of head mounted display device 2. The IMU 132 may include other inertial sensors in addition to or instead of magnetometer 132A, gyro 132B and accelerometer 132C.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are examples of reflective technologies which are efficient as most energy is reflected away from the modulated structure and may be used in the present system. Additionally, microdisplay 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light-guide optical element 115 transmits light from microdisplay 120 to the eye 140 of the user wearing head mounted display device 2. Light-guide optical element 115 also allows light from in front of the head mounted display device 2 to be transmitted through light-guide optical element 115 to eye 140, as depicted by arrow 142, thereby allowing the user to have an actual direct view of the space in front of head mounted display device 2 in addition to receiving a virtual image from microdisplay 120. Thus, the walls of light-guide optical element 115 are see-through. Light-guide optical element 115 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar substrate comprising light-guide optical element 115 by internal reflection. After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user.

As different light rays will travel and bounce off the inside of the substrate at different angles, the different rays will hit the various reflecting surfaces 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a light-guide optical element can be found in United States Patent Publication No. 2008/0285140, entitled "Substrate-Guided Optical Devices," published on Nov. 20, 2008. In one embodiment, each eye will have its own light-guide optical element 115. When the head mounted display device 2 has two light-guide optical elements, each eye can have its own microdisplay 120 that can display the same image in both eyes or different images in the two eyes. In another embodiment, there can be one light-guide optical element which reflects light into both eyes.

Opacity filter 114, which is aligned with light-guide optical element 115, selectively blocks natural light, either uniformly or on a per-pixel basis, from passing through light-guide optical element 115. Details of an example of opacity filter 114 are provided in U.S. Patent Publication No. 2012/0068913 to Bar-Zeev et al., entitled "Opacity Filter For See-Through Mounted Display," filed on Sep. 21, 2010. However, in general, an embodiment of the opacity filter 114 can be a see-through LCD panel, an electrochromic film, or similar device which is capable of serving as an opacity filter. Opacity filter 114 can include a dense grid of pixels, where the light transmissivity of each pixel is individually controllable between minimum and maximum transmissivities. While a transmissivity range of 0-100% is ideal, more limited ranges are also acceptable, such as for example about 50% to 90% per pixel.

A mask of alpha values can be used from a rendering pipeline, after z-buffering with proxies for real-world objects. When the system renders a scene for the mixed reality display, it takes note of which real-world objects are in front of which virtual objects as explained below. If a virtual object is in front of a real-world object, then the opacity may be on for the coverage area of the virtual object. If the virtual object is (virtually) behind a real-world object, then the opacity may be off, as well as any color for that pixel, so the user will see just the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. Displays capable of going from 0% to 100% opacity at low cost, power, and weight are the most desirable for this use. Moreover, the opacity filter can be rendered in color, such as with a color LCD or with other displays such as organic LEDs.

Head mounted display device 2 also includes a system for tracking the position of the user's eyes. As will be explained below, the system will track the user's position and orientation so that the system can determine the FOV of the user.

Figure 4:
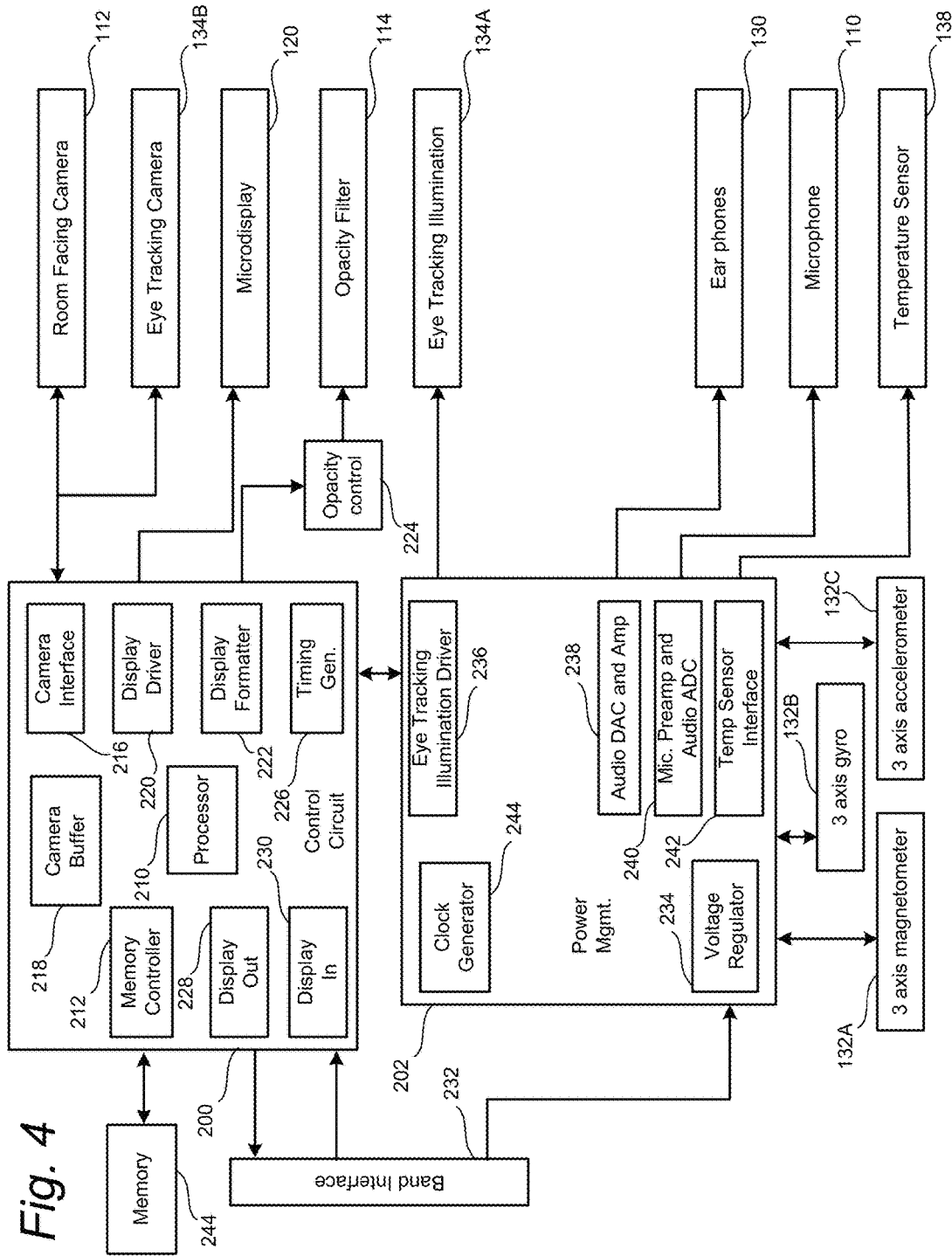
FIG. 4 is a block diagram of one embodiment of the components of a head mounted display unit.

However, a human will not perceive everything in front of them. Instead, a user's eyes will be directed at a subset of the environment. Therefore, in one embodiment, the system will include technology for tracking the position of the user's eyes in order to refine the measurement of the FOV of the user. For example, head mounted display device 2 includes eye tracking assembly 134 (FIG. 3), which has an eye tracking illumination device 134A and eye tracking camera 134B (FIG. 4). In one embodiment, eye tracking illumination device 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. For example, see U.S. Pat. No. 7,401,920, entitled "Head Mounted Eye Tracking and Display System", issued Jul. 22, 2008. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eyes usually move in unison. However, it is possible to track each eye separately.

In one embodiment, the system will use four IR LEDs and four IR photo detectors in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but just one infrared CCD on the side of the lens of head mounted display device 2. The CCD may use a small mirror and/or lens (fish eye) such that the CCD can image up to 75% of the visible eye from the glasses frame. The CCD will then sense an image and use computer vision to find the image, much like as discussed above. Thus, although FIG. 3 shows one assembly with one IR transmitter, the structure of FIG. 3 can be adjusted to have four IR transmitters and/or four IR sensors. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes can also be used.

FIG. 3 only shows half of the head mounted display device 2. A full head mounted display device may include another set of see-through lenses, another opacity filter, another light-guide optical element, another microdisplay 120, another lens 122, room-facing camera, eye tracking assembly 134, earphones, and temperature sensor.

Figure 5:
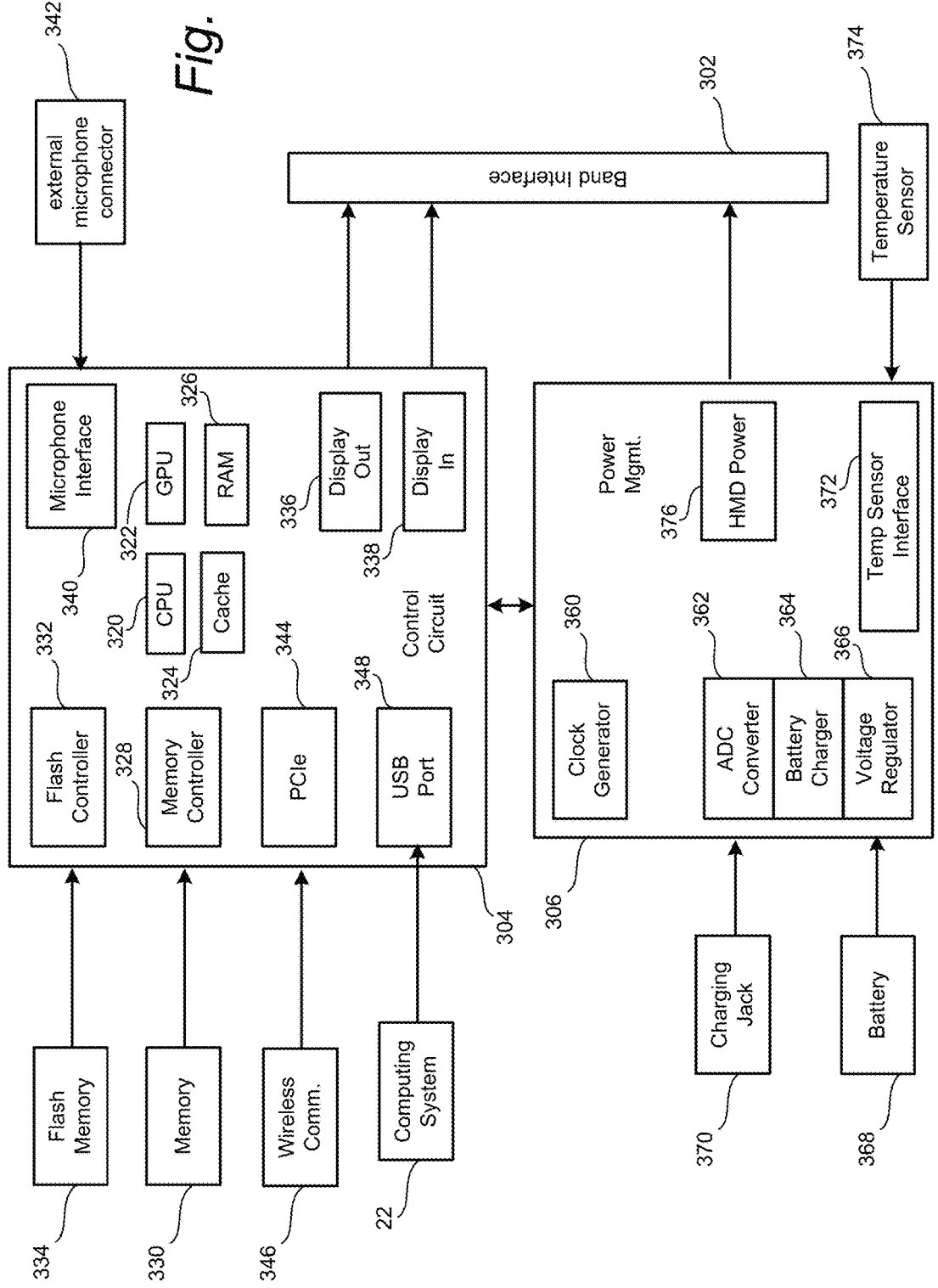
FIG. 5 is a block diagram of one embodiment of the components of a processing unit associated with a head mounted display unit.

FIG. 4 is a block diagram depicting the various components of head mounted display device 2. FIG. 5 is a block diagram describing the various components of processing unit 4. Head mounted display device 2, the components of which are depicted in FIG. 4, is used to provide a virtual experience to the user by fusing one or more virtual images seamlessly with the user's view of the real world. Additionally, the head mounted display device components of FIG. 4 include many sensors that track various conditions. Head mounted display device 2 will receive instructions about the virtual image from processing unit 4 and will provide the sensor information back to processing unit 4. Processing unit 4 may determine where and when to provide a virtual image to the user and send instructions accordingly to the head mounted display device of FIG. 4.

Some of the components of FIG. 4 (e.g., room-facing camera 112, eye tracking camera 134B, microdisplay 120, opacity filter 114, eye tracking illumination 134A, earphones 130, and temperature sensor 138) are shown in shadow to indicate that there are two of each of those devices, one for the left side and one for the right side of head mounted display device 2. FIG. 4 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230.

In one embodiment, the components of control circuit 200 are in communication with each other via dedicated lines or one or more buses. In another embodiment, the components of control circuit 200 is in communication with processor 210. Camera interface 216 provides an interface to the two room-facing cameras 112 and stores images received from the room-facing cameras in camera buffer 218. Display driver 220 will drive microdisplay 120. Display formatter 222 provides information, about the virtual image being displayed on microdisplay 120, to opacity control circuit 224, which controls opacity filter 114. Timing generator 226 is used to provide timing data for the system. Display out interface 228 is a buffer for providing images from room-facing cameras 112 to the processing unit 4. Display in interface 230 is a buffer for receiving images such as a virtual image to be displayed on microdisplay 120. Display out interface 228 and display in interface 230 communicate with band interface 232 which is an interface to processing unit 4.

Power management circuit 202 includes voltage regulator 234, eye tracking illumination driver 236, audio DAC and amplifier 238, microphone preamplifier and audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR light source for eye tracking illumination 134A, as described above. Audio DAC and amplifier 238 output audio information to the earphones 130. Microphone preamplifier and audio ADC 240 provides an interface for microphone 110. Temperature sensor interface 242 is an interface for temperature sensor 138. Power management circuit 202 also provides power and receives data back from three axis magnetometer 132A, three axis gyro 132B and three axis accelerometer 132C.

FIG. 5 is a block diagram describing the various components of processing unit 4. FIG. 5 shows control circuit 304 in communication with power management circuit 306. Control circuit 304 includes a central processing unit (CPU) 320, graphics processing unit (GPU) 322, cache 324, RAM 326, memory controller 328 in communication with memory 330 (e.g., D-RAM), flash memory controller 332 in communication with flash memory 334 (or other type of nonvolatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, BlueTooth communication device, infrared communication device, etc. The USB port can be used to dock the processing unit 4 to processing unit computing system 22 in order to load data or software onto processing unit 4, as well as charge processing unit 4. In one embodiment, CPU 320 and GPU 322 are the main workhorses for determining where, when and how to insert virtual three-dimensional objects into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (possibly located on the wrist band of processing unit 4). Analog to digital converter 362 is used to monitor the battery voltage, the temperature sensor and control the battery charging function. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

Figure 6:
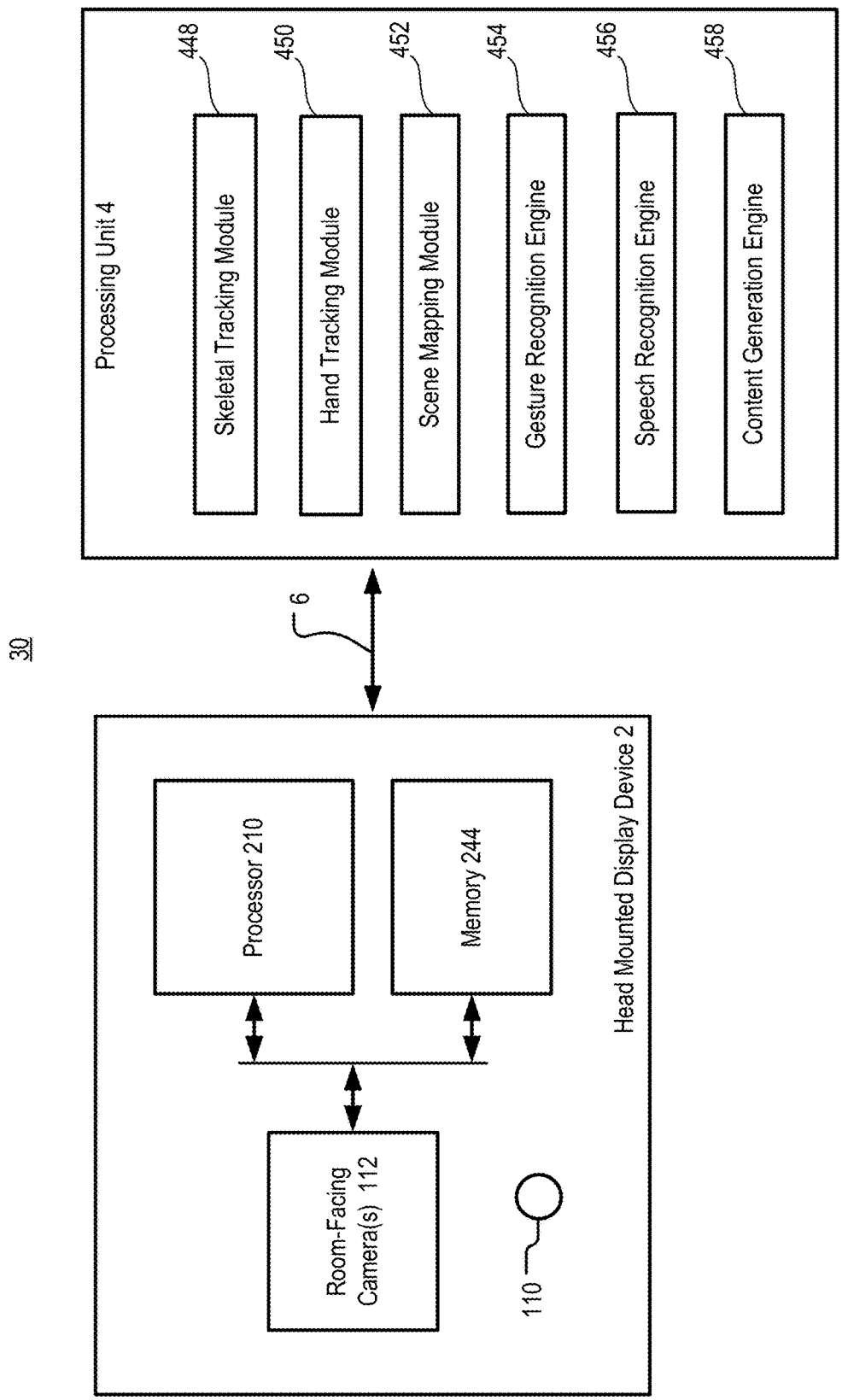
FIG. 6 is a block diagram of one embodiment of the software components of a processing unit associated with the head mounted display unit.

FIG. 6 illustrates a high-level block diagram of the mobile mixed reality assembly 30 including the room-facing camera 112 of the display device 2 and some of the software modules on the processing unit 4. Some or all of these software modules may alternatively be implemented on a processor 210 of the head mounted display device 2. As shown, the room-facing camera 112 provides image data to the processor 210 in the head mounted display device 2. In one embodiment, the room-facing camera 112 may include a depth camera, an RGB camera and an IR light component to capture image data of a scene. As explained below, the room-facing camera 112 may include less than all of these components.

Using for example time-of-flight analysis, the IR light component may emit an infrared light onto the scene and may then use sensors (not shown) to detect the backscattered light from the surface of one or more objects in the scene using, for example, the depth camera and/or the RGB camera. In some embodiments, pulsed infrared light may be used such that the time between an outgoing light pulse and a corresponding incoming light pulse may be measured and used to determine a physical distance from the room-facing camera 112 to a particular location on the objects in the scene, including for example a user's hands. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the room-facing camera 112 to a particular location on the objects by analyzing the intensity of the reflected beam of light over time via various techniques including, for example, shuttered light pulse imaging.

In another example embodiment, the room-facing camera 112 may use a structured light to capture depth information. In such an analysis, patterned light (i.e., light displayed as a known pattern such as a grid pattern, a stripe pattern, or different pattern) may be projected onto the scene via, for example, the IR light component. Upon striking the surface of one or more targets or objects in the scene, the pattern may become deformed in response. Such a deformation of the pattern may be captured by, for example, the 3-D camera and/or the RGB camera (and/or other sensor) and may then be analyzed to determine a physical distance from the room-facing camera 112 to a particular location on the objects. In some implementations, the IR light component is displaced from the depth and/or RGB cameras so triangulation can be used to determined distance from depth and/or RGB cameras. In some implementations, the room-facing camera 112 may include a dedicated IR sensor to sense the IR light, or a sensor with an IR filter.

It is understood that the present technology may sense objects and three-dimensional positions of the objects without each of a depth camera, RGB camera and IR light component. In embodiments, the room-facing camera 112 may for example work with just a standard image camera (RGB or black and white). Such embodiments may operate by a variety of image tracking techniques used individually or in combination. For example, a single, standard image room-facing camera 112 may use feature identification and tracking. That is, using the image data from the standard camera, it is possible to extract interesting regions, or features, of the scene. By looking for those same features over a period of time, information for the objects may be determined in three-dimensional space.

In embodiments, the head mounted display device 2 may include two spaced apart standard image room-facing cameras 112. In this instance, depth to objects in the scene may be determined by the stereo effect of the two cameras. Each camera can image some overlapping set of features, and depth can be computed from the parallax difference in their views.

A further method for determining a scene map with positional information within an unknown environment is known as simultaneous localization and mapping (SLAM). One example of SLAM is disclosed in U.S. Pat. No. 7,774,158, entitled "Systems and Methods for Landmark Generation for Visual Simultaneous Localization and Mapping." Additionally, data from the IMU can be used to interpret visual tracking data more accurately.

The processing unit 4 may include a scene mapping module 452. Using the data from the front-facing camera(s) 112 as described above, the scene mapping module is able to map objects in the scene (including one or both of the user's hands) to a three-dimensional frame of reference. Further details of the scene mapping module are described below.

In order to track the position of users within a scene, users may be recognized from image data. The processing unit 4 may implement a skeletal recognition and tracking module 448. An example of a skeletal tracking module 448 is disclosed in U.S. Patent Publication No. 2012/0162065, entitled, "Skeletal Joint Recognition And Tracking System." Such systems may also track a user's hands. However, in embodiments, the processing unit 4 may further execute a hand recognition and tracking module 450. The module 450 receives the image data from the room-facing camera 112 and is able to identify a user's hand, and a position of the user's hand, in the FOV. An example of the hand recognition and tracking module 450 is disclosed in U.S. Patent Publication No. 2012/0308140, entitled, "System for Recognizing an Open or Closed Hand." In general the module 450 may examine the image data to discern width and length of objects which may be fingers, spaces between fingers and valleys where fingers come together so as to identify and track a user's hands in their various positions.

The processing unit 4 may further include a gesture recognition engine 454 for receiving skeletal model and/or hand data for one or more users in the scene and determining whether the user is performing a predefined gesture or application-control movement affecting an application running on the processing unit 4. More information about gesture recognition engine 454 can be found in U.S. patent application Ser. No. 12/422,661, entitled "Gesture Recognizer System Architecture," filed on Apr. 13, 2009.

As mentioned above, a user may perform various verbal gestures, for example in the form of spoken commands to select objects and possibly modify those objects. Accordingly, the present system further includes a speech recognition engine 456. The speech recognition engine 456 may operate according to any of various known technologies.

In one example embodiment, the head mounted display device 2 and processing unit 4 work together to create the scene map or model of the environment that the user is in and tracks various moving or stationary objects in that environment. In addition, the processing unit 4 tracks the FOV of the head mounted display device 2 worn by the user 18 by tracking the position and orientation of the head mounted display device 2. Sensor information, for example from the room-facing cameras 112 and IMU 132, obtained by head mounted display device 2 is transmitted to processing unit 4. The processing unit 4 processes the data and updates the scene model. The processing unit 4 further provides instructions to head mounted display device 2 on where, when and how to insert any virtual three-dimensional objects. In accordance with the present technology, the processing unit 4 further implements a content generation software engine 458 for building virtual objects using a set of virtual tools. Each of the above-described operations will now be described in greater detail with reference to the flowchart of FIG. 7.

Figure 7:
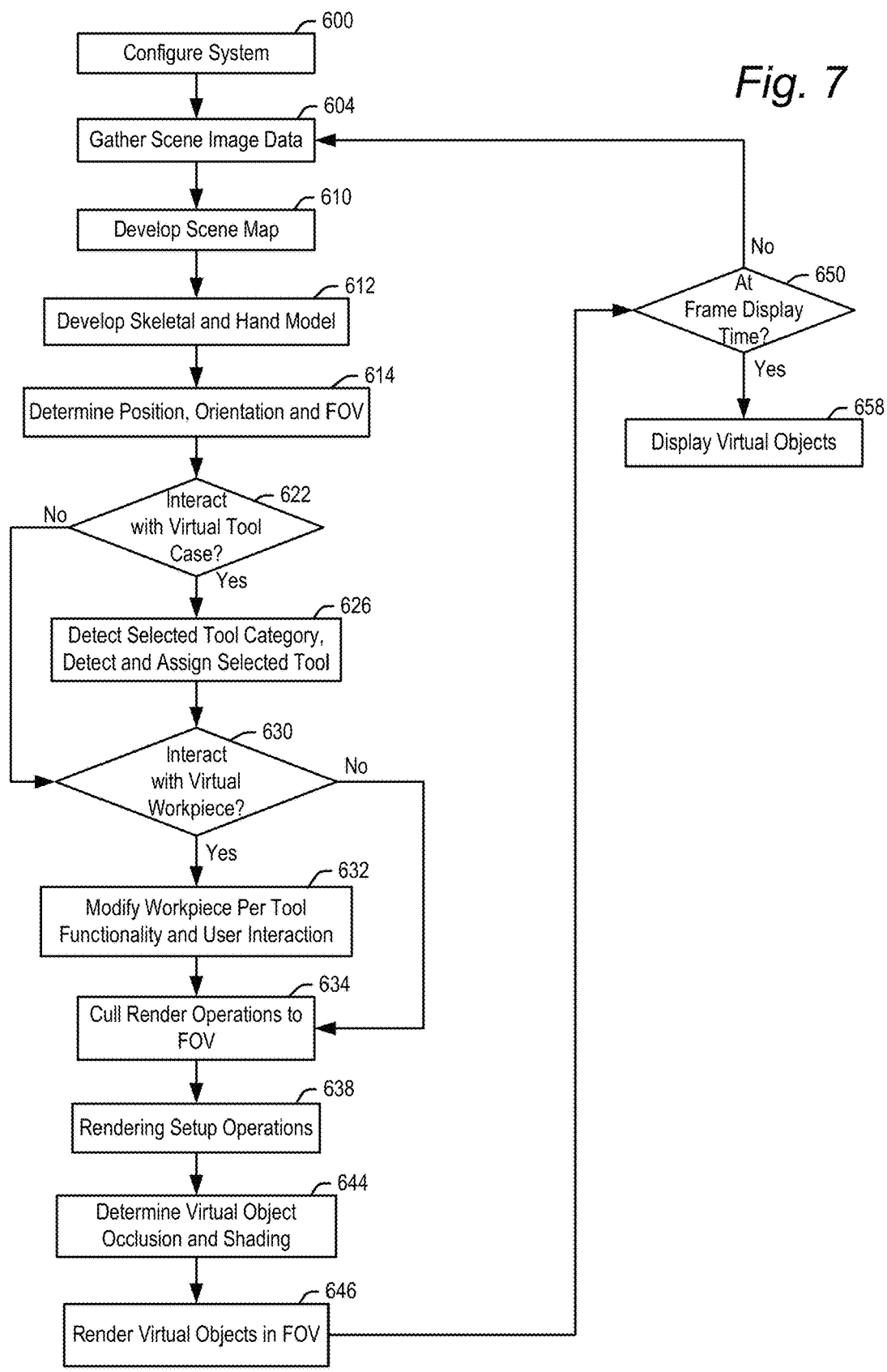
FIG. 7 is a flowchart showing the operation of one or more processing units associated with a head mounted display unit of the present system.

FIG. 7 is a high level flowchart of the operation and interactivity of the processing unit 4 and head mounted display device 2 during a discrete time period such as the time it takes to generate, render and display a single frame of image data to each user. In embodiments, data may be refreshed at a rate of 60 Hz, though it may be refreshed more often or less often in further embodiments.

In general, the system may generate a scene map having x, y, z coordinates of the environment and objects in the environment such as virtual objects and real world objects. For a given frame of image data, a user's view may include one or more real and/or virtual objects. As a user turns his or her head, for example left to right or up and down, positions of stationary real world and certain virtual objects do not change in three-dimensional space, but their positions do change in the user's FOV. Such objects may be referred to herein as world locked. Some virtual objects may remain in the same position in a user's FOV, even where a user moves his or her head. Such virtual objects may be referred to herein as being head locked.

The system for presenting a virtual environment to one or more users 18 may be configured in step 600. In accordance with aspects of the present technology, step 600 may include configuring a virtual tool case including a plurality of virtual tools enabling users to construct any of a variety of complex and creative virtual objects as explained below. A default configuration of the virtual tool case and/or the number, type and configuration of the virtual tools may be defined by an application running on the processing unit 4, or other computing device. These default configurations for the virtual tool case and virtual tools may be altered and saved by the user.

In steps 604 the processing unit 4 gathers data from the scene. This may be image data sensed by the head mounted display device 2, and in particular, by the room-facing cameras 112, the eye tracking assemblies 134 and the IMU 132.

A scene map may be developed in step 610 identifying the geometry of the scene as well as the geometry and positions of objects within the scene. In embodiments, the scene map generated in a given frame may include the x, y and z positions of a user's hand(s), other real world objects and virtual objects in the scene. Methods for gathering depth and position data have been explained above.

The processing unit 4 may next translate the image data points captured by the sensors into an orthogonal 3-D scene map. This orthogonal 3-D scene map may be a point cloud map of all image data captured by the head mounted display device cameras in an orthogonal x, y, z Cartesian coordinate system. Methods using matrix transformation equations for translating camera view to an orthogonal 3-D world view are known. See, for example, David H. Eberly, "3d Game Engine Design: A Practical Approach To Real-Time Computer Graphics," Morgan Kaufman Publishers (2000).

Figure 8:
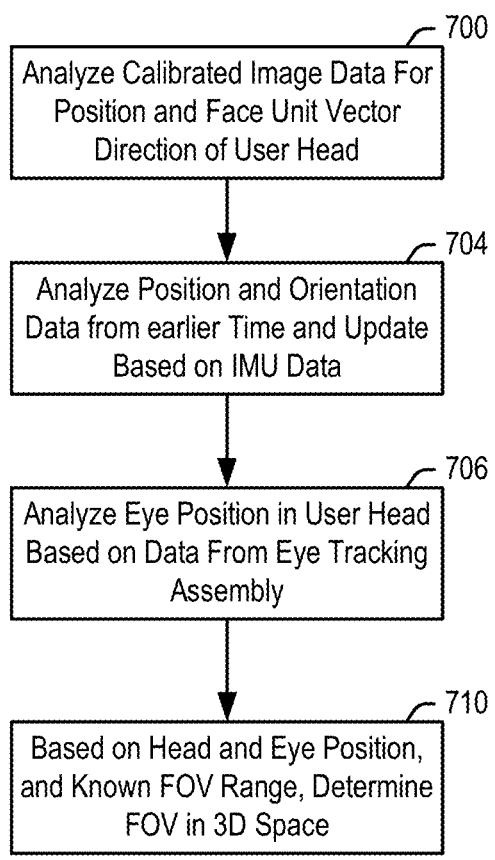
FIGS. 8-10C are more detailed flowcharts of examples of various steps shown in the flowchart of FIG. 7.
Figure 9:
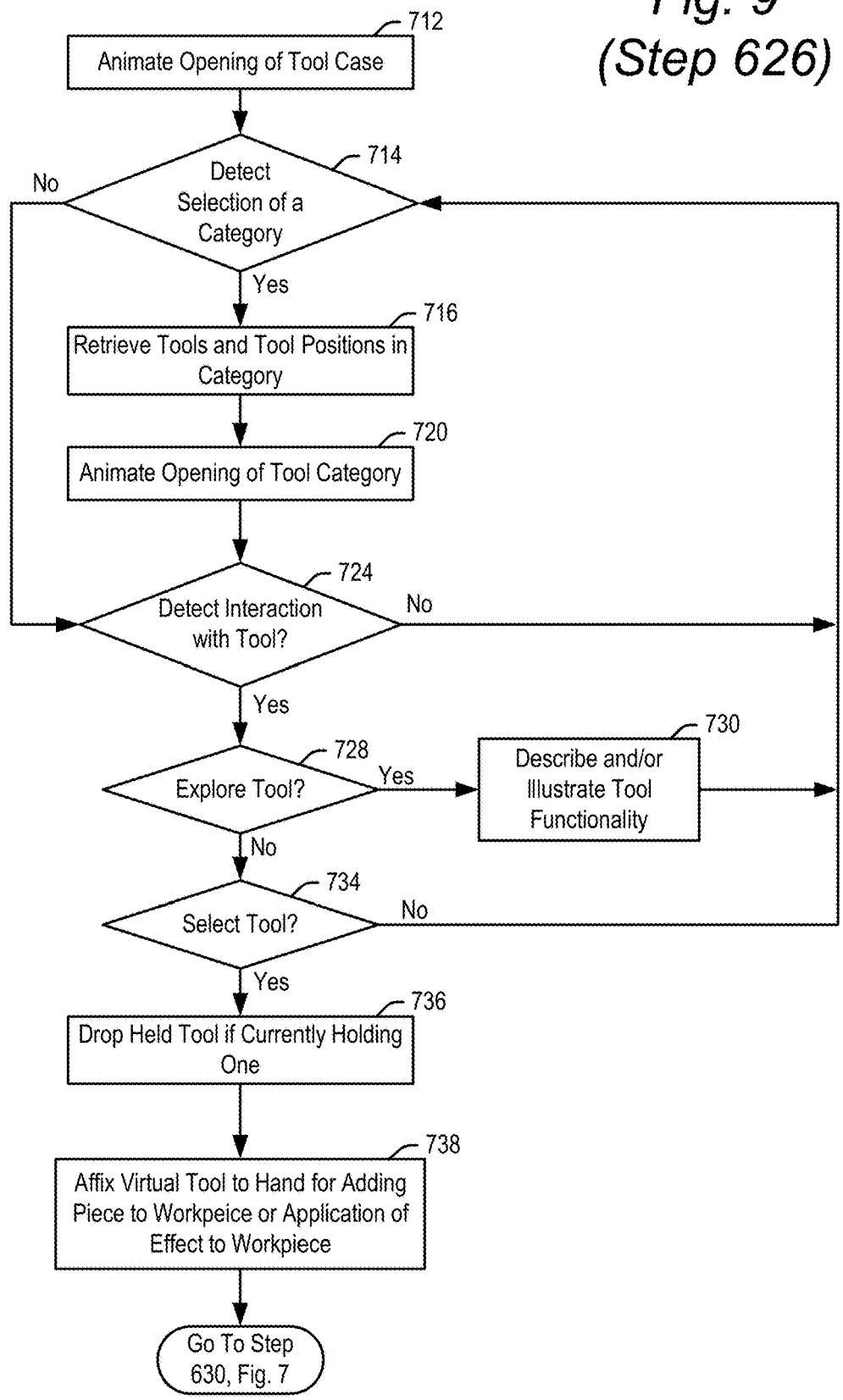

In step 612, the system may detect and track a user's skeleton and/or hands as described above, and update the scene map based on the positions of moving body parts and other moving objects. In step 614, the processing unit 4 determines the x, y and z position, the orientation and the FOV of the head mounted display device 2 within the scene. Further details of step 614 are now described with respect to the flowchart of FIG. 8.

In step 700, the image data for the scene is analyzed by the processing unit 4 to determine both the user head position and a face unit vector looking straight out from a user's face. The head position may be identified from feedback from the head mounted display device 2, and from this, the face unit vector may be constructed. The face unit vector may be used to define the user's head orientation and, in examples, may be considered the center of the FOV for the user. The face unit vector may also or alternatively be identified from the camera image data returned from the room-facing cameras 112 on head mounted display device 2. In particular, based on what the cameras 112 on head mounted display device 2 see, the processing unit 4 is able to determine the face unit vector representing a user's head orientation.

In step 704, the position and orientation of a user's head may also or alternatively be determined from analysis of the position and orientation of the user's head from an earlier time (either earlier in the frame or from a prior frame), and then using the inertial information from the IMU 132 to update the position and orientation of a user's head. Information from the IMU 132 may provide accurate kinematic data for a user's head, but the IMU typically does not provide absolute position information regarding a user's head. This absolute position information, also referred to as "ground truth," may be provided from the image data obtained from the cameras on the head mounted display device 2.

In embodiments, the position and orientation of a user's head may be determined by steps 700 and 704 acting in tandem. In further embodiments, one or the other of steps 700 and 704 may be used to determine head position and orientation of a user's head.

It may happen that a user is not looking straight ahead. Therefore, in addition to identifying user head position and orientation, the processing unit may further consider the position of the user's eyes in his head. This information may be provided by the eye tracking assembly 134 described above. The eye tracking assembly is able to identify a position of the user's eyes, which can be represented as an eye unit vector showing the left, right, up and/or down deviation from a position where the user's eyes are centered and looking straight ahead (i.e., the face unit vector). A face unit vector may be adjusted to the eye unit vector to define where the user is looking.

In step 710, the FOV of the user may next be determined. The range of view of a user of a head mounted display device 2 may be predefined based on the up, down, left and right peripheral vision of a hypothetical user. In order to ensure that the FOV calculated for a given user includes objects that a particular user may be able to see at the extents of the FOV, this hypothetical user may be taken as one having a maximum possible peripheral vision. Some predetermined extra FOV may be added to this to ensure that enough data is captured for a given user in embodiments.

The FOV for the user at a given instant may then be calculated by taking the range of view and centering it around the face unit vector, adjusted by any deviation of the eye unit vector. In addition to defining what a user is looking at in a given instant, this determination of a user's FOV is also useful for determining what may not be visible to the user. As explained below, limiting processing of virtual objects to those areas that are within a particular user's FOV may improve processing speed and reduces latency.

As noted, aspects of the present technology relate to using virtual tools to build three-dimensional content. Such content may be generated by the content generation engine 458 (FIG. 6) executing on processing unit 4, based on input received via the head mounted display device 2. Generation of virtual content via the content generation engine 458, processing unit 4 and display device 2 will now be explained in greater detail reference to FIGS. 9-18. While the following describes processing steps performed by the processing unit 4, it is understood that these steps may also or alternatively be performed by a processor within the head mounted display device 2 and/or some other computing device.

Interactions with the virtual tools and the virtual workpiece as explained below may be accomplished by the user performing various predefined gestures. Physical gestures may be used to select virtual tools or portions of the workpiece, such as for example touching, pointing at, grabbing or gazing at a virtual tool or portion of the workpiece. Verbal gestures may alternatively or additionally be used to select virtual tools or portions of the workpiece, such as for example, "grab cylinder," or "grab paintbrush." Physical and verbal gestures may be used to modify the workpiece, such as for example saying, "paint workpiece blue," or pointing at a portion of the workpiece to select it, and saying "enlarge selected pieces by 50%." These gestures are by way of example only and a wide variety of other gestures may be used to interact with the virtual tools and build virtual content.

In embodiments, the virtual tools may be displayed as being stored within or around a virtual tool case (see for example the virtual tool cases 480 in FIGS. 11-18). This gives the user the impression of working with real world tools which are often stored in real world tool cases. However, it is understood that the virtual tool case 480 may be omitted in embodiments, and the virtual tools can be arranged for selection by user in some other manner (affixed to a wall or some other surface or simply floating in three-dimensional space).

In step 622, the processing unit 4 detects interaction with a virtual tool case. Such interaction may be by a predefined physical gesture, such as pointing, grabbing or eye gaze, and/or by verbal gesture. If such interaction is detected in step 622, the processing unit 4 detects selection of a tool category or specific tool in step 626. In response, the processing unit 4 may open a tool category or assign the selected virtual tool. Further details of step 626 will now be explained with reference to FIG. 9.

In step 712, the processing unit 4 and head mounted display device 2 may display an animation of the virtual tool case transitioning from a closed to an open position over the course of several video frames. For example, a virtual tool case 480 may initially be displayed to a user in the closed position, as shown for example in FIG. 11. Upon interacting with the virtual tool case 480, it may then open to the position shown in FIG. 12, displaying a variety of virtual tools 496 within, and possibly around, the virtual tool case 480.

The animation showing the opening of the virtual tool case again gives the user an impression of working with a real world tool case which a user may open up. However, it is understood that step 712 may be omitted, and the virtual tool case 480 may simply be displayed to the user in an open position with the virtual tools 496 visible therein. Specific examples of the virtual tool case 480 are shown in FIGS. 11-18. However, it is understood that the size and shape of virtual tool case 480, and arrangement of virtual tools within and around virtual tool case 480, may vary greatly in further embodiments.

Figure 12:
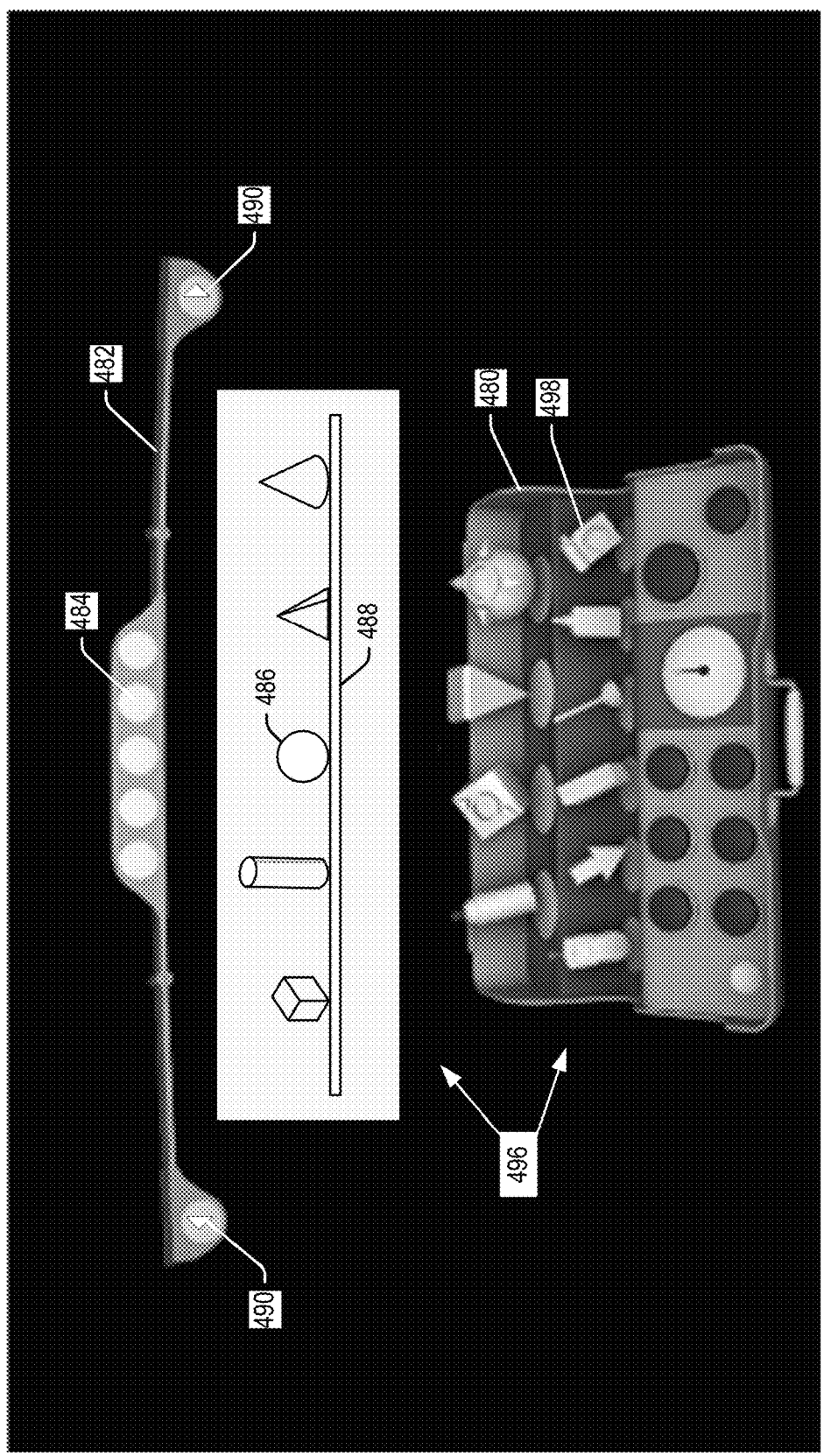

Referring now to FIG. 12, upon opening the tool case 480, a header bar 482 may be displayed for providing access to different categories of virtual tools, settings and functionality. The header bar 482 may include category buttons 484 (one of which is labeled in FIG. 12) for navigating between the different categories. One of the categories may display a variety of virtual building blocks, referred to herein as virtual pieces, which can be selected, modified and assembled together to build virtual content. FIG. 12 illustrates a few examples of pieces 486 (one of which is labeled) which a user may select and combine to build any of a wide variety of complex virtual objects. The virtual pieces 486 may be positioned on a virtual shelf or rack 488, though the shelf or rack may be omitted and the tools simply suspended in space. Once selected, the pieces 486 may be modified (scaled, rotated, stretched, colored, etc.) as explained below. Once selected, the pieces 486 may also be combined together on a virtual work surface, explained below.

The pieces 486 shown are simple three-dimensional geometric shapes, such as for example spheres, cylinders, cuboids, pyramids, cones, etc. The geometric shapes may in general be any three-dimensional polyhedron comprised of curved surfaces, or any of a variety of regular and/or irregular shaped polygons. The polygons in a given polyhedron may the same as or different from each other.

The pieces 486 may alternatively be three-dimensional replicas of any of a variety of real world objects. Such replicas could be almost anything, including as a few examples a chair, a car, a house, building or monument, an animal, a tree or plant, a computer or other electronic device, a person (generic, replica of a real person or replica of a fictional character), footwear, clothing, food items, sporting equipment, a robot, monster etc. While a few such objects have been set forth here, it is understood that any or almost any real world, fictional or fabricated object may be modeled as a virtual object and stored as a piece 486.

Another category accessible by category buttons 484 may be pieces 486 consisting of virtual content which is been built in the past and saved by the user or another. The header bar 482 may include virtual forward and back scroll buttons 490 allowing a user to scroll through a large number of pieces 486 which can be selected by a user, and used to build new virtual content.

Figure 13:
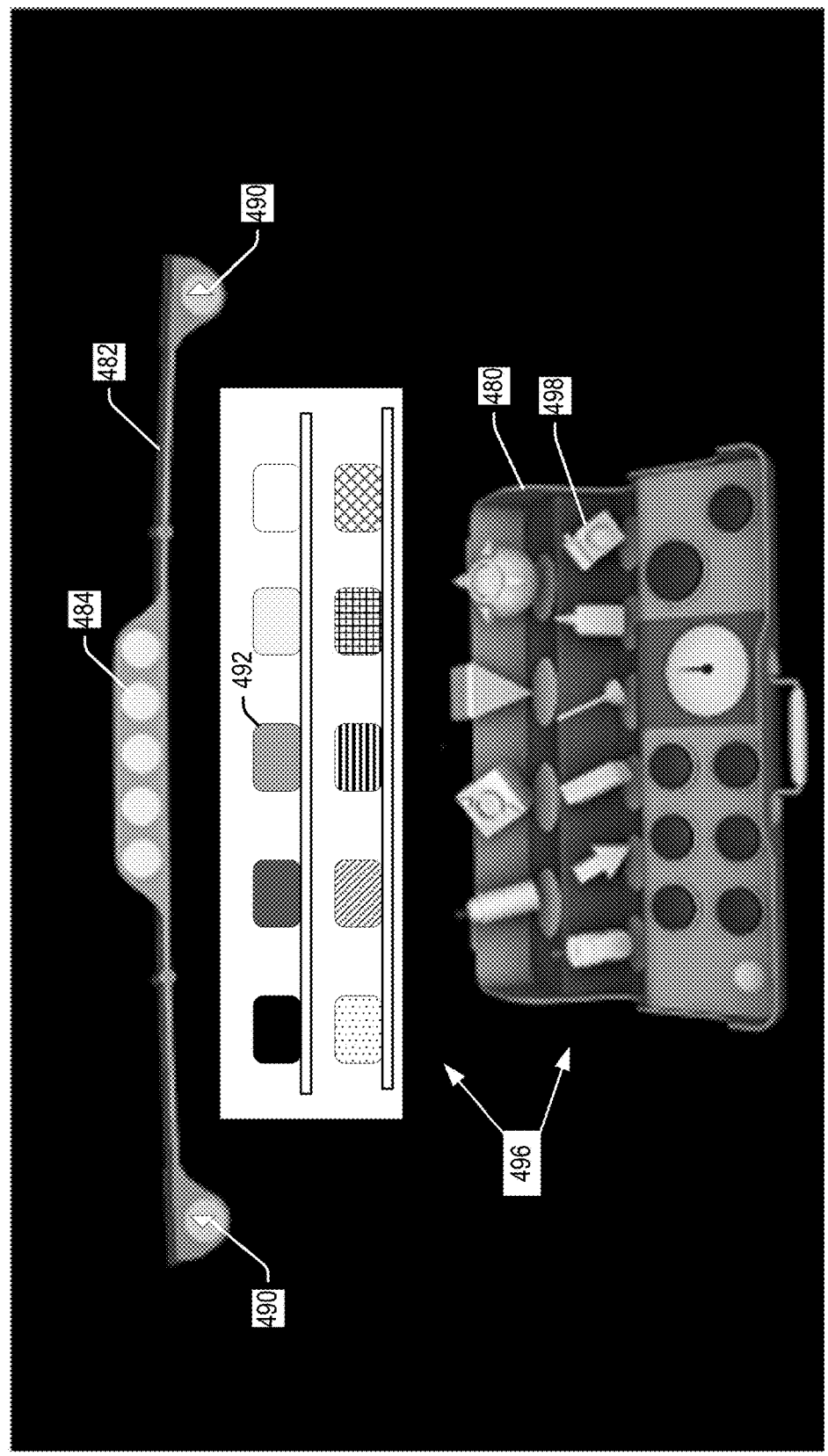

Another category accessible by category buttons 484 may be a color palette as shown in FIG. 13. The color palette may include any of a variety of different colors and textures 492 (one of which is labeled in FIG. 13) which may be selected and applied to portions of a workpiece or the workpiece as a whole as explained below. In addition to a number of predefined colors and textures, a user may have a real world object having an arbitrary color and/or texture which may be held up and scanned by room-facing camera 112. Thereafter, data for reproducing the scanned color and/or texture may be stored and presented as an option for selection within the palette shown in FIG. 13. The virtual forward and back scroll buttons 490 may be used to scroll through a large number of colors and/or textures 492.

The header bar 482 may include other categories, such as for example a home category which may display features of the system and messages to a user. Another category may be a settings category where a user may customize the virtual tool case 480 and virtual tools 496. As used herein, virtual tools include virtual pieces 486, virtual colors and textures 492, and virtual effect tools 498, explained below, in and/or around the tool case 480. In further embodiments, each of the virtual pieces 486, virtual colors and textures 492, and virtual effect tools 498 may be arranged within the tool case 480.

In step 714, the processing unit 4 may detect selection of a given category by interaction with category buttons 484. If such interaction is detected, the processing unit 4 may retrieve the virtual tools 496 and tool positions for that category from memory in step 716. In step 720, the processing unit 4 and the head mounted display device 2 may animate the opening of a tool category over a number of frames, for example by having shelves 488 appear, and having virtual tools 496 pop up on those shelves.

In addition to or instead of detecting selection of a category, the processing unit may detect interaction with a virtual tool 496 in step 724. A user may interact with a virtual tool 496 in a number of ways. For example, a user may wish to learn more about a given virtual tool 496, such as for example a virtual piece 486 or a virtual effect tool 498 in tool case 480. In step 728, the processing unit 4 and head mounted display device 2 may detect some predefined exploration gesture. Upon such detection, in step 730, the processing unit 4 and display device 2 may verbally, textually and/or illustratively provide information on the operation and functionality of the selected virtual tool 496.

A user may alternatively interact with a virtual tool 496 by selecting that tool in step 734. If selection of a virtual tool is detected in step 734, the processing unit 4 may cause the user to "drop" a virtual tool that the user had been using before selection of the new virtual tool. "Drop" here refers to the user no longer having the functionality of the previously held virtual tool for application to a workpiece. In embodiments displaying tools as being held in the user's hands, the tool held in the user's hand may also change as explained below.

In step 738, a newly selected virtual tool 496 may be affixed to a user's hand so as to move with the user's hand in three-dimensional space. It is conceivable that a user may manipulate a virtual tool 496 in his or her hand so as to hold the virtual tool 496 at different locations of the virtual tool 496, as well as having the ability to rotate the virtual tool 496 about three orthogonal axes to different orientations in space.

As noted above, there are different types of virtual tools 496, including pieces 486, colors and textures 492 and virtual effect tools 498. When a user selects a virtual tool 496, that selection may be indicated by the tool appearing in the hand of the user, and thereafter moving with the user's hand for application to a workpiece under construction as explained below. In further embodiments, a user may select a tool, for example a piece 486 by pointing at it, or gazing at it, or by speaking its name. Thereafter, the selected tool may be maneuvered in space, for example floating off the shelf and floating to a position on the work surface or workpiece as explained below. In further embodiments, when a user selects a virtual tool 496, it may not appear in the user's hand (and does not float off the shelf). The tool selection is however stored in memory, and the selected piece may appear on the work surface, or a color or tool functionality may be applied to the workpiece when the user interacts with the workpiece as explained below.

Referring again to FIG. 7, in step 630, the processing unit 4 may check for interaction with a virtual workpiece, for example using a virtual tool 496 retrieved in step 626. If interaction with a virtual workpiece is detected in step 630, the workpiece may be modified in step 632 per the selected tool functionality and user interaction with the workpiece. Further details of step 632 now be explained with reference to FIGS. 10A-10C.

In step 750, the processing unit 4 checks whether the user is adding a piece 486 to a workpiece. The processing unit 4 may make this determination based on whether the user has selected a piece 486 as described above. Referring now to FIG. 14, the processing unit 4 and head mounted display device 2 may cooperate to display a virtual work surface 560, which may for example be a virtual table, workbench or other virtual workspace where user has room to construct virtual content. The virtual work surface 560 may be omitted in further embodiments, where for example the user chooses to build virtual content on a real world work surface. FIG. 14 also shows another example of a tool case 480, including a header bar 482 as described above, and a few virtual pieces 486 and virtual effect tools 498 arrayed on virtual shelves 488 of the case 480. As noted, the tool case 480 may have any of a variety of appearances and display varying numbers of virtual tools 496 at a given time.

In one mode of operation, pieces may be placed on work surface 560, and connected to each other using a "snap" mode. This mode is explained below, but in general, virtual pieces 486 may have a slight magnetism effect for each other and the work surface 560 so that when they are near another virtual piece or work surface, they may "snap" or jump to an aligned position in contact with the other virtual piece or on the virtual work surface. The following steps of FIG. 10A describe addition of virtual pieces 486 to the work surface 560 and/or other virtual pieces in snap mode. However, it is understood that virtual pieces may be positioned by a user anywhere on, in or above the work surface 560, or in any relation to other virtual pieces in further embodiments. As noted, this includes positioning a selected virtual piece through the work surface 560 or through a surface of another virtual piece. A selected piece 486 may also attach to an existing piece 486 by touching a selected piece to a surface of the existing piece.

Figure 15:
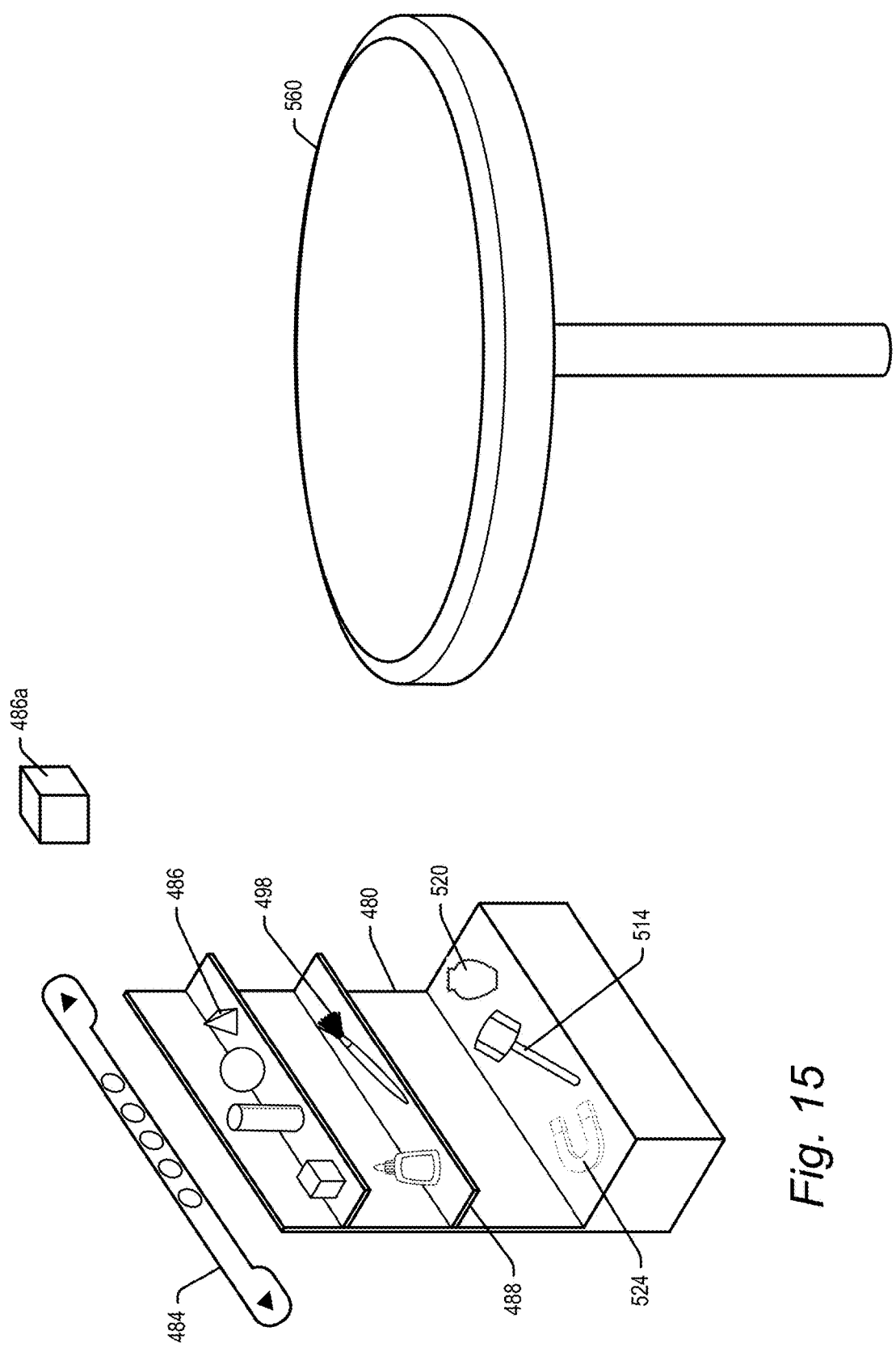

In FIG. 15, a user has selected a piece 486, a cuboid 486a in this example, and is moving to the work surface 560. As noted above, in embodiments, a user may select a piece 486 and point, gaze or otherwise gesture to a position on the work surface 560, and the selected piece may float to that position, as shown in FIGS. 15 and 16. In step 752, the processing unit 4 may track the position of a selected virtual piece relative to the work surface 560 or another virtual piece 486 as the selected virtual piece is moved. In step 754, the processing unit 4 detects when a surface of the selected virtual piece 486 is proximate the work surface or another virtual piece. If a proximate position is detected, the selected piece is connected to the work surface 560 or other virtual piece in step 758, as shown in FIG. 16. As noted, the processing unit 4 may simply position the selected virtual piece 486 on, above or through the work surface 560, or other virtual piece, upon receiving some predefined gesture from the user to drop the selected virtual piece.

The piece 486a may be rotated about one or more axes, as shown in FIG. 17, using a virtual rotation effect tool and a pick and place virtual tool as explained below. The piece 486a may also or alternatively be stretched along one or more axes, as shown in FIG. 18, using a virtual resizing effect tool and a pick and place virtual tool as explained below.

FIG. 19 shows a second piece 486b which has been positioned adjacent the first piece 486a per steps 752, 754 and 758 to form a workpiece (or partial workpiece) 830. In embodiments, the placement of the added virtual piece 486 in relation to an already placed virtual piece in step 758 is positional and not a true connection. That is, after placement, either piece may be moved and the other piece will stay in its position without moving. As explained below, two or more virtual pieces may be connected, or "glued," together so that they move together. In further embodiments, it is conceivable that pieces be connected upon initial positioning of a selected piece in step 758 so that, once positioned together, movement of one piece moves the connected pieces together.

Figure 20:
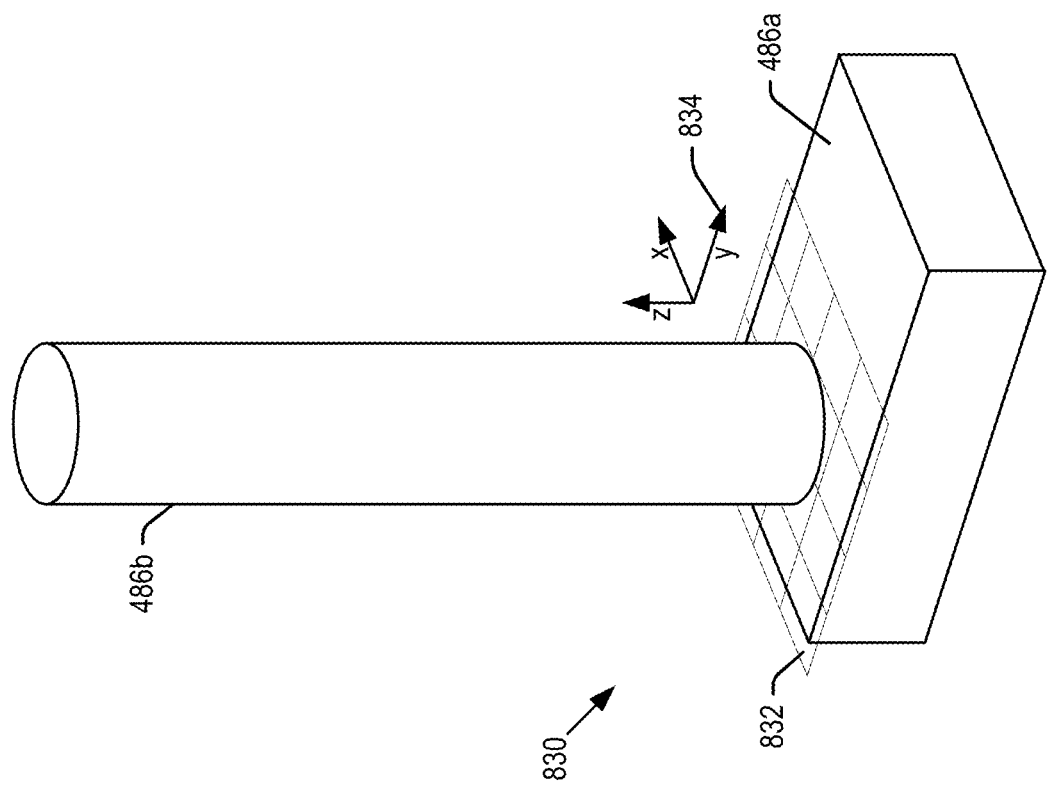

Virtual pieces 486 may attach together in intelligent ways to easily build more complex virtual workpieces 830. A user can attach a selected piece 486b to different surfaces of the existing piece 486a by moving around the existing piece 486a until the user is facing the desired attachment surface of piece 486a. As shown in FIG. 20, the piece 486b may snap or otherwise preferentially align to a position where a major planar surface (for example that is parallel to plane 832) aligns with a parallel surface of the existing piece 486a. Thus, in the simple example of the workpiece 830 shown, the cylinder piece 486b may be easily positioned to extend perpendicularly from a surface of cuboid piece 486a to which piece 486b is attached. Alternatively, the user may define which surface of the selected piece 486b is to attach to the existing piece 486a. Moreover, the bias of piece 486b with respect to its alignment, being perpendicular and/or being tangent to piece 486a may be overcome by the user when positioning piece 486b in the workpiece 830. Virtual orthogonal axes 834 may or may not be displayed to aid in construction of virtual workpieces 830.

Figure 21:
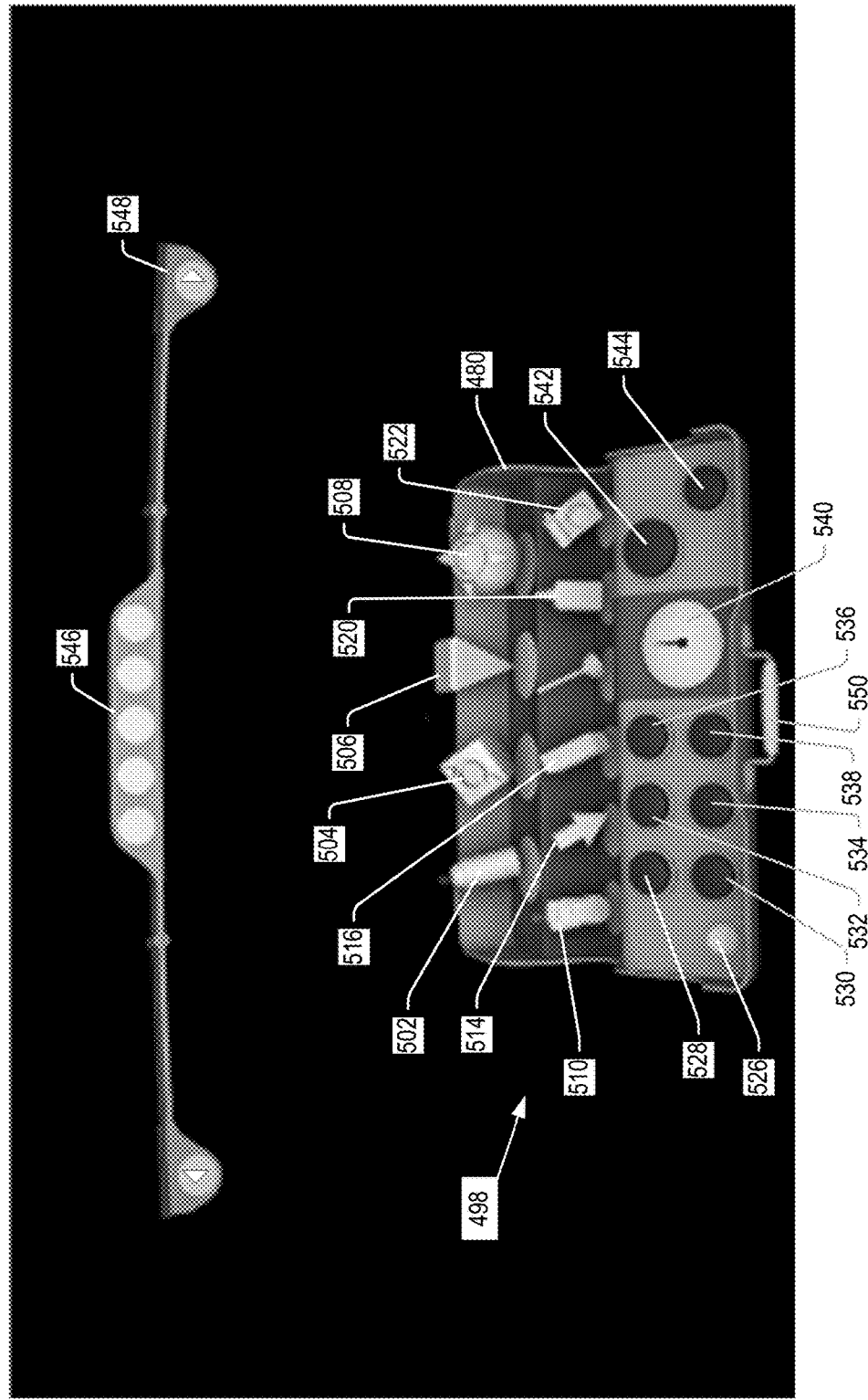

Instead of adding a piece 486 to a workpiece 830, a user has the option of adding an effect to, or otherwise modifying, one or more pieces 486 of a workpiece 830. In general, a user may select any of the virtual effect tools 498 from the tool case 480 for this purpose. An explanation of some of the ways a workpiece 830 may be modified by a virtual effect tool 498 will now be provided with reference to the tool case 480 shown in FIG. 21. In FIG. 21, the pieces and/or paint/texture gallery which may normally be displayed above tool case 480 are omitted for clarity.

Virtual tool case 480 may include a virtual effect tool 502 for painting or texturing a piece or pieces 486 of a workpiece 830. In general, when a virtual effect tool applies some effect, such as painting, texturing or the effects described below, the effect is applied to an individual piece 486 which is selected by a user after selecting a particular virtual effect tool 498. However, as explained below, one of the virtual effect tools 498 is a gluing function which allows a user to select multiple pieces 486 which then, in effect, get glued to each other. At that point, movement of one piece 486 in a glued body of pieces results in movement of all the glued pieces together. Additionally, application of an effect with a virtual effect tool 498 to one of the pieces in a glued body results in application of the effect to all pieces in the glued body.

Referring again to the painting or texturing virtual effect tool 502, a user may select this tool and thereafter, a color or texture selected from the color and texture palette shown in FIG. 13 may be applied to a piece or pieces 486 in the workpiece 830. A user may select the painting or texturing virtual effect tool 502 via physical or verbal gesture, such as for example grabbing the virtual effect tool 502 from tool case 480. After selecting the painting or texturing virtual effect tool 502, a user may thereafter select a desired color or texture from the palette shown in FIG. 13. Alternatively, a user may have earlier selected a color or texture from the palette shown in FIG. 13, which remains the default color or texture when the painting or texturing virtual effect tool 502 is selected.

Once the painting or texturing virtual effect tool 502 is selected, the processing unit 4 and head mounted display device 2 may display some virtual object such as a spray can (FIG. 21) or a paintbrush (FIG. 14) affixed to the user's hand or otherwise maneuvered in space. Thereafter, a user may select a piece or pieces 486 for application of the selected color or texture by touching the spray can or paintbrush to the selected piece or pieces. Alternatively, the piece or pieces 486 to be painted or textured may be selected by some other physical or verbal gesture.

It is understood that for each of the virtual effect tools 498 described below, upon selection of a given virtual effect tool, the processing unit 4 and head mounted display device 2 may display some representative virtual object, such as the associated virtual effect tool 498 shown in FIG. 21. Alternatively, no virtual object for the virtual effect tool is shown, but instead, the functionality of the tool is assigned. Thus, upon the user touching a piece or pieces 486, or performing some other physical or verbal gesture selecting a piece or pieces 486, the effect of the assigned virtual effect tool is applied.

Additionally, for each of the virtual effect tools 498 described below, instead of applying the effect to a piece or group of glued pieces, some gesture may be performed indicating that the selected effect is to be applied to the workpiece 830 as a whole.

The virtual tool case 480 may further include a resizing virtual effect tool 504. Upon selection of the tool 504, a user may select a piece or group of pieces 486 and thereafter perform some gesture such as pulling or pushing to enlarge or shrink the selected piece or pieces 486. The size of the selected piece or pieces may change proportionally in each of three orthogonal axes. Alternatively, a user may perform some gesture so that the selected piece or pieces are stretched along a single axis, while remaining unchanged about the remaining two axes. An example of the resizing virtual effect tool is shown in FIG. 18. A virtual object 504*a* may be displayed, indicating that the resizing virtual effect tool 504 has been selected and is being applied.

The virtual tool case 480 may further include a pick and place virtual effect tool 506. Upon selection of the tool 506, a user may select a piece or group of pieces 486 from the workpiece 830, and thereafter move that piece or those pieces to some other position in the workpiece 830. Pick and place virtual effect tool 506 may also be used in conjunction with other tools to designate an axis about or along which a particular effect is to be applied. For example, a user may select the resizing virtual effect tool 504, and then select the pick and place virtual effect tool 506 to designate a specific axis along which the piece is to be stretched. As another example, a rotation virtual effect tool is described below. A user may select the rotation virtual effect tool, and then select the pick and place virtual effect tool 506 to designate a specific axis about which the piece is to be rotated. Examples of the pick and place virtual effect tool 506 are shown in FIGS. 17 and 18. A virtual object 506*a* may be displayed, indicating that the pick and place virtual effect tool 506 has been selected and is being applied.

As noted, the virtual tool case 480 may further include a rotation virtual effect tool 508. Upon selection of the tool 508, a user may select a piece or group of pieces 486 and thereafter perform some gesture such as rotating his or her hand to rotate the selected piece or pieces 486. The orientation of the selected piece or pieces may change proportionally in each of three orthogonal axes. Alternatively, a user may perform some gesture so that the selected piece or pieces are rotated about a single axis, while remaining unchanged about the remaining two axes. An example of the rotation virtual effect tool is shown in FIG. 17. A virtual object 508*a* may be displayed, indicating that the rotation virtual effect tool 508 has been selected and is being applied.

In embodiments, at the same time it is performing other functions described herein, the processing unit 4 is continuously receiving data from room-facing cameras 112 to continuously scan and update the three-dimensional mapping of real world objects in the mixed reality environment. However, in further embodiments, to save processing power, the processing unit 4 may only periodically receive feedback from room-facing cameras 112 regarding the positions of real world objects. For such embodiments, the virtual tool case 480 may further include a surface scanning tool 510. Upon selection of the tool 510, the room-facing cameras 112 may scan a particular real world object at which the user is looking, or the cameras 112 may scan the augmented reality environment in general and provide feedback to the processing unit 4.

As noted above, in embodiments, the virtual work surface 560 may be omitted, and instead virtual workpieces may be built on a surface of a real world object. In such embodiments, the surfaces of the real world object may be scanned upon selection of the surface scanning tool 510.

The virtual tool case 480 may further include a fine adjustment virtual effect tool 514. The tool 514 may for example be displayed as an arrow (as shown in FIG. 17) or a mallet (as shown in FIG. 14). Upon selection of the tool 514, a user may perform some gesture, such as tapping or nudging a piece or group of pieces 486 in a workpiece, to make fine (small) changes in the position of the selected piece or pieces in the direction of the tap or nudge. The amount by which the selected piece or pieces move upon each tap or nudge may be user-defined or set by default.

The virtual tool case 480 may further include an erase virtual effect tool 516. Upon selection of the tool 516, a user may select a piece or group of pieces, which are then deleted from the workpiece 830.

The virtual tool case 480 further include a glue virtual effect tool 520. As described above, upon selection of the tool 520, a user may select two or more pieces 486 from the workpiece 830, which pieces are then, in effect, glued together and treated as a single piece 486. Thereafter, the glued group of pieces may be moved together and a virtual effect applied to one of the pieces in the group may automatically be applied to all of the pieces in the group.

The virtual tool case 480 further include a camera virtual effect tool 522. Upon selection of the tool 522, a user may capture an image or a video of the augmented reality environment including both virtual workpieces and real world objects. Thus, as one example, a user may build a workpiece 830 in the form of a virtual hat, and thereafter, move the virtual hat to a position on a second user's head. Upon selection of the camera virtual effect tool 522, the user may capture an image or video including the second user wearing the virtual hat. Virtual images captured by tool 522 may thereafter be displayed in two or three dimensional viewers. Alternatively, data captured by tool 522 may be sent to a known 3-D printer for creating a three-dimensional real world replica of the captured data.

The virtual tool case 480 may further include a magnet virtual effect tool 524 (FIG. 14). As described above, when adding a selected piece 486 to a workpiece 830, a user can move the selected piece through existing pieces of the workpiece 830. Upon selection of the magnet virtual effect tool 524, when a selected piece 486 is added to a workpiece 830, it will connect with an existing piece with which it comes into contact, instead of passing through that existing piece.

In embodiments, the virtual tool case 480 may further include a sculpting virtual effect tool 520 (FIG. 14). Upon selection of tool 520, a user may sculpt, i.e., alter the shape of, a selected piece or pieces 486 in a variety of ways. This virtual effect may use natural hand motions or other gestures from a user, as if sculpting a lump of clay to a desired shape. In this embodiment, the system is able to detect the user's hand movements relative to the space occupied by the selected piece or pieces, and interpret how the user wishes to alter the appearance of the piece or pieces. Physics may be used so that forceful hand movements may result in a greater change in an impacted area of the piece or pieces than would a subtle hand movement.

Still further virtual effects tools may appear as and perform functions analogous to known wood-working and metal-working tools. For example, a virtual lathe may be used to form pieces, starting for example from a cylinder, having differing circular diameters along their lengths. A virtual band saw may be used to make one or more cuts through virtual pieces along a selected axis. A virtual drill may be used to drill holes through pieces with drill bits of user-selected diameter. Other wood-working and metal-working tools may be used to modify pieces into desired shapes.

The virtual tool case 480 may further include a number of virtual buttons which perform, or toggle on and off, a variety of different functions. For example, the virtual tool case 480 may include a button 526 for muting and un-muting user speech recognition. The head mounted display device 2 may normally listen for and interpret verbal commands from a user. However, where for example a user is having a conversation, the user may not wish speech in that conversation to be interpreted as verbal commands. The user may thus press button 526 to turn off speech recognition, and then press button 526 again to resume speech recognition when the conversation is finished.

The virtual tool case 480 may further include a button 528 to a new virtual content-creation session; that is, start building a new workpiece 830. When pressed, the button 528 may save and exit an existing virtual content-creation session, and then start a new content-creation session. A button 530 may also be provided in tool case 480 to save an existing virtual content-creation session without exiting.

The virtual tool case 480 may further include a snap button 532. This button may toggle between a snap functionality being turned on and off. As set forth above, when turned on, the snap functionality provides a magnetism effect between new and existing pieces 486 so that they snap together in a default alignment and orientation when they are proximate to each other.

The virtual tool case 480 may further include a copy button 534. When this button is pressed, a selected piece, pieces or workpiece as a whole may be copied. Thereafter, the copied objects may be pasted elsewhere. A mirror button 538 may also be provided, which may have similar functionality to the copy button 534, except that mirror button 538 creates a mirror of the selected piece, pieces or workpiece after it is pressed. Thereafter, the mirror object may be pasted elsewhere. The mirror button may be useful when a workpiece 830 includes mirror virtual objects, such as for example wings on an airplane.

The virtual tool case 480 may further include an export button 536. When this button is pressed, a virtual workpiece 830 may be printed, saved or otherwise exported into a format other than the native format by which the content generation engine 458 normally saves data.

In embodiments, there may be a limit to the number of pieces 486 which can be added to a workpiece 830. The virtual tool case 480 may include a gauge 540 (or some other virtual display) indicating how many pieces 486 have been added to a workpiece 830, and how many more pieces may be added before the limit is reached.

The virtual tool case 480 may further include a button 542 for undoing the previously performed action. When pressed, if the previous action was to add a piece 486, that piece may be removed. If the previous action was to apply some virtual effect, that virtual effect may be undone. The virtual tool case 480 may further include a button 544 for redoing a previously undone action.

The virtual tool case 480 may further include a virtual handle 550. Upon selection of the virtual handle 550, the virtual tool case 480 may be moved to another user-defined location within the mixed reality environment. The virtual tool case 480 may close or remain open while being moved.

The description of the virtual effect tools 498 provided above is by way of example only, and it is understood that the present technology is not limited to the virtual effect tools described above or shown in the figures. For example, one or more of the virtual effect tools described above may be omitted. Other virtual effect tools may be used in addition to or instead of one or more of the virtual effect tools described above. Furthermore, it is understood that the particular arrangement of virtual effect tools in tool case 480 shown in the figures is by way of example, and the virtual effect tools maybe rearranged and displayed in any of a variety of different combinations. Moreover, the particular virtual objects used to represent the various virtual effect tools in the figures is by way of example, and it is understood that a given virtual effect tool may be represented in the displayed virtual tool case 480 as any of various different virtual objects and/or text.

Figure 10A:
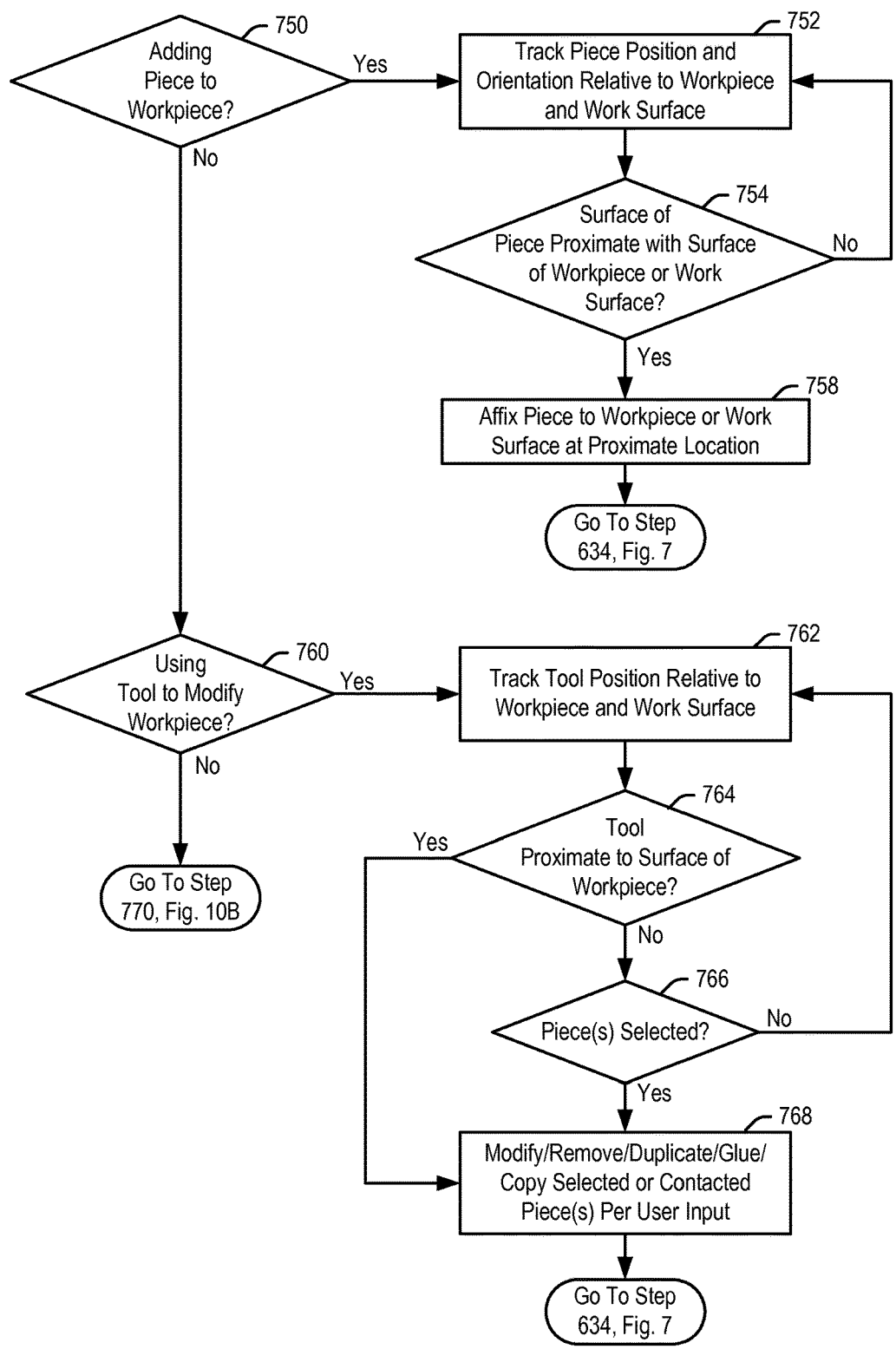
Figure 10B:
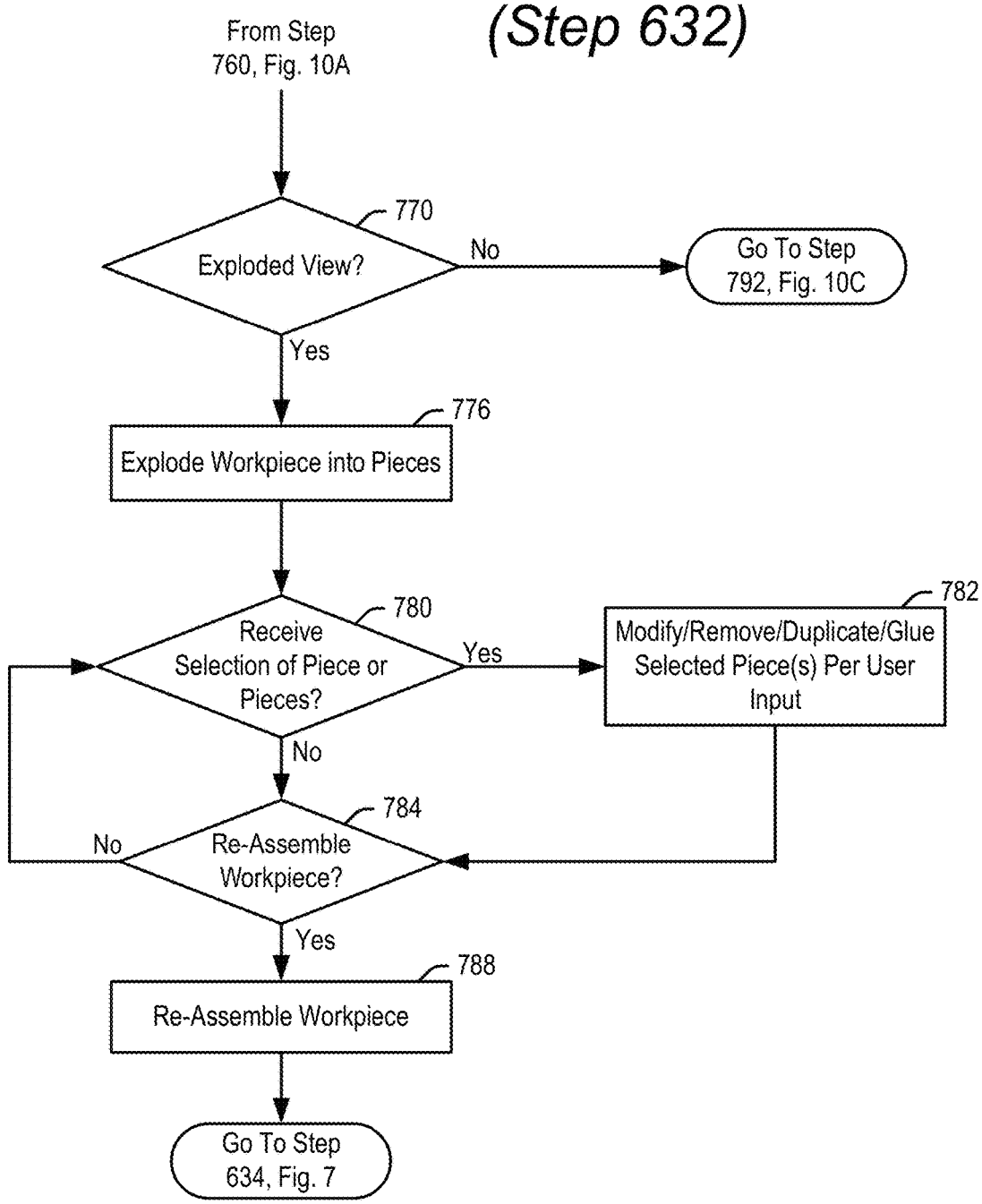
Figure 11:
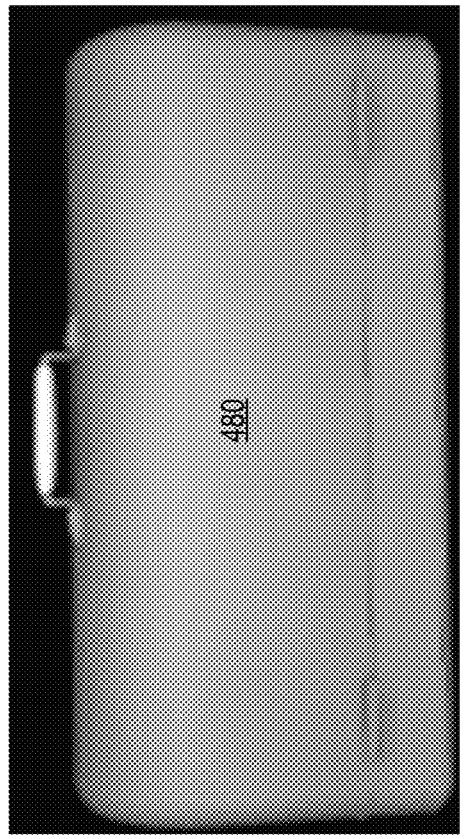

Referring again to the flowchart of FIG. 10A, in step 760, the processing unit 4 may detect the use of a virtual effect tool 498 to modify a workpiece 830 (as a result of a user having selected a virtual effect tool). In step 762, the processing unit may track the position of a user's hand, or virtual effect tool carried in the user's hand. In step 764, the processing unit 4 may detect whether the user has positioned a virtual effect tool proximate to, on or in a piece 486. If so, the processing unit 4 may perform a step 768 of applying the selected effect to the selected piece, group of glued pieces or workpiece as a whole. As noted above, this may involve modifying, moving, rotating, removing, duplicating, gluing, copying, etc., the selected piece or pieces.

A user may continue to add pieces, modify pieces and/or apply virtual effects to the pieces to build workpieces 830 into complex and creative virtual content. FIG. 22 shows an example where pieces and virtual effects have been applied to build a workpiece 830 in the form of a robot. As indicated above, any of a wide variety of virtual content may be constructed using the virtual workshop of the present technology. Once created, a workpiece may be stored (and possibly used as a piece in later creations) and/or exported.

FIG. 23 illustrates one of the wide variety of virtual effects which may be applied to a workpiece 830. In this example, the user has selected the painting or texturing virtual effect tool 502. The processing unit 4 and head mounted display device 2 may display a representative virtual object, a paintbrush in this example, being held or otherwise maneuvered in space. When the user touches the virtual paintbrush to a surface of the workpiece 830, a selected color or texture is applied to the selected workpiece 830 as shown in FIG. 23. As noted above, pieces of workpiece 830 that are glued to each other may each be painted when the paintbrush is applied.

While creating virtual content workpiece 830, a user may wish to view the workpiece 830 from various perspectives. Given the three-dimensional nature of workpiece 830, a user has the ability to walk around a workpiece and view it from the front, sides, bottom, rear and top. In accordance with further aspects of the present technology, a user may further get an exploded view and/or a cross-sectional view of the workpiece.

In step 770, (FIG. 10B), the processing unit 4 detects whether the user has performed some predefined gesture requesting to view an exploded view of the workpiece. If such predefined gesture is detected, the processing unit 4 explodes the workpiece 830 into its respective pieces in step 776. A glued group of pieces may stay as an integrated whole, and then possibly subsequently exploded into its respective pieces (possibly including a further group of glued pieces) upon another gesture to further explode the workpiece. Alternatively, the workpiece including pieces and glued pieces may all be exploded into individual pieces upon receiving the initial request for the exploded view. In the exploded view, the user may have the ability to move around respective pieces to view each of them from all perspectives.

While in the exploded view, a user may wish to apply an effect to an individual piece or group of glued pieces. In step 780, the processing unit 4 detects selection of a virtual effect tool and a piece or pieces. Upon such detection, in step 782, the processing unit 4 may modify, move, rotate, color, remove, duplicate, glue, copy, etc. one or more pieces in accordance with a selected special effect tool.

In step 784, the processing unit detects whether a user has performed a predefined gesture to reassemble the workpiece, either in its original form or as modified in step 782. If such a request to reassemble is received, the workpiece may be reassembled in step 788.

Instead of or in addition to an exploded view, a user may wish to see a cross-sectional view through a section of the workpiece 830. In step 792, (FIG. 10C), the processing unit 4 detects whether the user has performed some predefined gesture requesting a cross-sectional view of the workpiece. The cross-sectional view may be provided through a user-defined plane, which plane may be defined by three user-provided points in three-dimensional space. If a request for a cross-sectional view is received in step 792, the processing unit 4 may then prompt and look for input from the user to enter three points in space in step 794. For example, a user may place the tip of his/her finger at a given point in space and provide a verbal gesture indicating that that point is to be selected as one of the points.

The processing unit 4 may wait for input of the three user-defined points. The processing unit 4 may wait for some predetermined period of time, and if that period times out in step 796 without receipt of the points, the system may prompt the user for the points in step 800, or may simply jump back to the beginning of the flow (step 750, FIG. 10A) without providing the cross-sectional view.

Assuming the three points are received in step 794, the processing unit may determine a plane through those three points in step 804, and determine how the workpiece 830 would appear if sliced through that plane. In step 806, the two halves of the workpiece on either side of the plane may be displayed to the user spaced apart from each other. As surfaces of pieces 486 would not have a thickness as stored by the processing unit 4, the pieces which are dissected in the cross-sectional view may be provided with some wall thickness so that the cross-sectional view of the respective pieces may be visible to the user.

A user may wish to dynamically alter the cross-sectional view to view different cross-sections of the workpiece. In step 810, the processing unit 4 may look for adjustment of one or more of the points by the user which defined the cross-sectional plane. If the processing unit 4 detects some predefined gesture moving one or more of the three points, in step 812, the processing unit 4 may determine a revised plane through those three points, and determine how the workpiece 830 would appear if sliced through that plane. The flow then returns to step 806 to display the respective halves of the workpiece on either side of the revised cross-sectional plane.

The processing unit 4 additionally looks for a predefined gesture to reassemble the workpiece in step 816. If such a request is received, the processing unit 4 may reassemble the workpiece in step 820.

In step 632 (FIG. 7) the processing unit 4 may look for the above-described possible user interactions with a workpiece. As set forth above, those include adding a piece to the workpiece (step 750, FIG. 10A), using a virtual effect tool to modify the workpiece (step 760, FIG. 10A), receiving an exploded view of the workpiece (step 770, FIG. 10B) and/or receiving a cross-sectional view (step 792, FIG. 10C). As indicated at step 792 in FIG. 10C, if none of these interactions is received or recognized by the processing unit 4, the flow may return to the next step, step 634, in FIG. 7. It is understood that interactions with the workpiece 830 other than those set forth above are contemplated within the present technology.

The virtual workshop described above with respect to FIGS. 9-23 provides several advantages. For example, the system allows users to create three-dimensional virtual content from the same perspective from which it will be viewed. Thus, problem found in creating three-dimensional content using a two dimensional system are alleviated. Moreover, the present system uses known and familiar woodworking and metal working paradigms in a virtual environment to make it easy to build three-dimensional virtual content. Furthermore, the present system allows a user to build virtual content with his or her hands, physically assembling virtual pieces together using his or her head and eyes to position virtual pieces in three dimensional space.

Referring again to FIG. 7, in step 634, the processing unit 4 may cull the rendering operations so that just those virtual objects which could possibly appear within the final FOV of the head mounted display device 2 are rendered. The positions of other virtual objects may still be tracked, but they are not rendered. It is also conceivable that, in further embodiments, step 634 may be skipped altogether and the entire image is rendered.

The processing unit 4 may next perform a rendering setup step 638 where setup rendering operations are performed using the scene map and FOV received in steps 610 and 614. Once virtual object data is received, the processing unit may perform rendering setup operations in step 638 for the virtual objects which are to be rendered in the FOV. The setup rendering operations in step 638 may include common rendering tasks associated with the virtual object(s) to be displayed in the final FOV. These rendering tasks may include for example, shadow map generation, lighting, and animation. In embodiments, the rendering setup step 638 may further include a compilation of likely draw information such as vertex buffers, textures and states for virtual objects to be displayed in the predicted final FOV.

Using the information regarding the locations of objects in the 3-D scene map, the processing unit 4 may next determine occlusions and shading in the user's FOV in step 644. In particular, the scene map has x, y and z positions of objects in the scene, including any moving and non-moving virtual or real objects. Knowing the location of a user and their line of sight to objects in the FOV, the processing unit 4 may then determine whether a virtual object partially or fully occludes the user's view of a real world object. Additionally, the processing unit 4 may determine whether a real world object partially or fully occludes the user's view of a virtual object.

In step 646, the GPU 322 of processing unit 4 may next render an image to be displayed to the user. Portions of the rendering operations may have already been performed in the rendering setup step 638 and periodically updated. Any occluded virtual objects may not be rendered, or they may be rendered. Where rendered, occluded objects will be omitted from display by the opacity filter 114 as explained above.

In step 650, the processing unit 4 checks whether it is time to send a rendered image to the head mounted display device 2, or whether there is still time for further refinement of the image using more recent position feedback data from the head mounted display device 2. In a system using a 60 Hertz frame refresh rate, a single frame is about 16 ms.

If time to display an updated image, the images for the one or more virtual objects are sent to microdisplay 120 to be displayed at the appropriate pixels, accounting for perspective and occlusions. At this time, the control data for the opacity filter is also transmitted from processing unit 4 to head mounted display device 2 to control opacity filter 114. The head mounted display would then display the image to the user in step 658.

On the other hand, where it is not yet time to send a frame of image data to be displayed in step 650, the processing unit may loop back for more recent sensor data to refine the predictions of the final FOV and the final positions of objects in the FOV. In particular, if there is still time in step 650, the processing unit 4 may return to step 604 to get more recent sensor data from the head mounted display device 2.

The processing steps 600 through 658 are described above by way of example only. It is understood that one or more of these steps may be omitted in further embodiments, the steps may be performed in differing order, or additional steps may be added.

In summary, an example of the present technology relates to a system for presenting a virtual environment comprising a virtual workshop, the virtual environment being coextensive with a real world space, the system comprising: a head mounted display device including a display unit for displaying three-dimensional virtual objects in the virtual environment, the virtual objects including a plurality of virtual tools for building a virtual workpiece; and a processing unit operatively coupled to the display device, the processing unit receiving a first input indicating selection of one or more virtual tools of the plurality of virtual tools, and the processing unit receiving a second input indicating a manner in which the selected one or more virtual tools is to be applied to the virtual workpiece in building the virtual workpiece.

Another example of the present technology relates to a virtual workshop generated by a processing unit and displayed by a head mounted display device, the virtual workshop comprising: a virtual tool case displayed via the head mounted display device; a plurality of virtual tools displayed via the head mounted display device inside or above the virtual, the plurality of virtual tools including a plurality of virtual pieces and a plurality of virtual effect tools; a work surface; a virtual workpiece, transformed by the processing unit and received input, into completed virtual content from the plurality of virtual tools, the plurality of virtual tools selected from the virtual tool case and applied to the virtual workpiece positioned on the work surface.

In a further example, the present technology relates to a method of creating virtual content from within a virtual environment; comprising the steps of: (a) displaying a virtual tool case and a plurality of virtual tools within the virtual tool case; (b) receiving selection of a first virtual tool of the plurality of virtual tools, the first virtual tool comprising a virtual piece used a building block in the virtual content; (c) receiving, in three-dimensional space, positioning of the first virtual tool on a virtual work surface; (d) receiving selection of a second virtual tool of the plurality of virtual tools, the second virtual tool comprising a virtual piece used a building block in the virtual content; (e) receiving, in three dimensional space, an alignment of the second virtual tool with respect to the first virtual tool; (f) receiving selection of a third virtual tool of the plurality of virtual tools, the third virtual tool comprising a virtual effect tool; and (g) applying, with the third virtual tool in three dimensional space, a virtual effect to at least one of the first and second virtual tools.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A system for presenting an augmented reality environment comprising a virtual workshop, the system comprising:
   a head mounted display device including a display unit for displaying stereoscopic, three-dimensional virtual objects in the augmented reality environment, the virtual objects including a virtual tool case and a plurality of virtual tools within the virtual tool case for building a virtual workpiece, the virtual tool case displayed as a three-dimensional, real world tool case from different perspectives as a position of a user moves with reference to the tool case around the augmented reality environment, and the plurality of virtual tools displayed within the virtual tool case and appearing as three dimensional tools having corresponding real world counterparts; and
   a processing unit operatively coupled to the head mounted display device, the processing unit configured to:
      receive a first input indicating selection of one or more virtual tools of the plurality of virtual tools;
      cause, based on the first input, the one or more virtual tools to be displayed with a hand of the user; and
      receive a second input indicating a manner in which the selected one or more virtual tools is to be applied to the virtual workpiece in building the virtual workpiece.

2. The system of claim 1, the head mounted display device displaying the plurality of virtual tools in a virtual tool case.

3. The system of claim 1, the plurality of virtual tools comprising virtual pieces used to build the virtual workpiece, and virtual effect tools for affecting changes in the virtual pieces used to build the virtual workpiece.

4. The system of claim 1, wherein the first input comprises selecting a plurality of virtual pieces and arranging them with respect to each other on a work surface.

5. The system of claim 4, wherein the work surface is virtual.

6. The system of claim 4, wherein the plurality of virtual pieces snap together into alignment when placed in vicinity to each other.

7. The system of claim 4, wherein the second input comprises receiving selection of one or more virtual effect tools which, upon selection, affect a change in one or more selected pieces of the plurality of virtual pieces.

8. The system of claim 7, wherein the one or more virtual effect tools include at least one of a painting and texturing virtual effect tool for applying at least one of a selected color and texture to the one or more selected pieces.

9. The system of claim 7, wherein the plurality of virtual effect tools include at least one virtual effect tool for affecting at least one of moving, rotating, removing, duplicating, gluing, or copying the one or more selected pieces.

10. A virtual workshop generated by a processing unit and displayed in an augmented environment by a head mounted display device, the virtual workshop comprising:
    a virtual tool case displayed stereoscopically via the head mounted display device, the virtual tool case displayed as a three-dimensional, real world tool case from different perspectives as a position of a user moves with reference to the virtual tool case around the augmented reality environment;
    a plurality of virtual tools displayed via the head mounted display device inside or above the virtual tool case, the plurality of virtual tools including a plurality of virtual pieces and a plurality of virtual effect tools;

a work surface; and a virtual workpiece, transformed by the processing unit and received input, into completed virtual content from the plurality of virtual tools, the plurality of virtual tools selected from the virtual tool case and applied to the virtual workpiece positioned on the work surface, wherein a first input, received by the processing unit, indicates a selection of one or more of the plurality of virtual tools, wherein the selection causes the one or more virtual tools to be displayed with a hand of the user, and wherein a second input, received by the processing unit, indicates a manner in which the selected one or more virtual tools is to be applied to the virtual workpiece.

11. The virtual workshop recited in claim 10, the plurality of virtual pieces used as building blocks for the workpiece.

12. The virtual workshop recited in claim 11, wherein the plurality of virtual pieces comprise three-dimensional geometric shapes.

13. The virtual workshop recited in claim 11, wherein the plurality of virtual pieces comprise three-dimensional virtual replicas of real world objects.

14. The virtual workshop recited in claim 11, the plurality of virtual effect tools for modifying one or more of the plurality of virtual pieces in the workpiece.

15. The virtual workshop recited in claim 11, the plurality of virtual tools further comprising colors and textures for coloring and texturing one or more of the plurality of virtual pieces in the workpiece.

16. The virtual workshop recited in claim 15, where at least one of a color and texture is captured from a real world object and scanned into memory of use as the at least one color and texture.

17. The virtual workshop recited in claim 10, wherein the work surface, on which the virtual workpiece is assembled into the completed virtual content, is virtual.

18. A method of creating virtual content from within an augmented reality environment; comprising:

displaying a virtual tool case as three-dimensional, real world tool case and a plurality of virtual tools within the virtual tool case from different perspectives as a position of a user moves with reference to the virtual tool case around the augmented reality environment;

receiving selection of a first virtual tool of the plurality of virtual tools, the first virtual tool comprising a first virtual piece used as a first building block in the virtual content;

receiving, in a three-dimensional space, positioning of the first virtual tool on a virtual work surface;

receiving selection of a second virtual tool of the plurality of virtual tools, the second virtual tool comprising a second virtual piece used as a second building block in the virtual content;

altering a shape of at least one of the first virtual tool and the second virtual tool;

receiving, in the three dimensional space, an alignment of the second virtual tool with respect to the first virtual tool;

receiving selection of a third virtual tool of the plurality of virtual tools, the third virtual tool comprising a virtual effect tool;

causing, based on the selection of the third virtual tool, the third virtual tool to be displayed with a hand of the user;

receiving an input indicating a manner in which the third virtual tool is to be applied to one or more of the first virtual tool or the second virtual tool; and applying, with the third virtual tool in the three dimensional space, a virtual effect to at least one of the first virtual tool or the second virtual tool based on the input.

19. The method of claim 18, further comprising at least one of displaying an exploded view of the virtual content displaying the first virtual tool and the second virtual tool spaced from each other, and displaying a cross-sectional view of the virtual content through a plane defined from user-input points.

20. The method of claim 18, further comprising:

receiving selection of a fourth virtual tool, the fourth virtual tool capturing an image of the virtual content and at least one real world object, and generating a three-dimensional real world model of the virtual content and the at least one real world object.

* * * * *